United States Patent
Nakamura et al.

(10) Patent No.: US 10,551,532 B2
(45) Date of Patent: Feb. 4, 2020

(54) IMAGING DEVICE AND IMAGING METHOD

(71) Applicant: Hitachi, Ltd., Chiyoda-ku, Tokyo (JP)

(72) Inventors: Yusuke Nakamura, Tokyo (JP); Takeshi Shimano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 25 days.

(21) Appl. No.: 15/721,992

(22) Filed: Oct. 2, 2017

(65) Prior Publication Data

US 2018/0095200 A1 Apr. 5, 2018

(30) Foreign Application Priority Data

Oct. 4, 2016 (JP) .................... 2016-196270

(51) Int. Cl.
| | |
|---|---|
| G02B 5/18 | (2006.01) |
| G02B 27/00 | (2006.01) |
| H04N 5/225 | (2006.01) |
| H04N 5/232 | (2006.01) |
| H04N 5/369 | (2011.01) |

(52) U.S. Cl.
CPC ......... *G02B 5/1842* (2013.01); *G02B 5/1871* (2013.01); *G02B 27/0037* (2013.01); *G02B 27/0068* (2013.01); *G02B 27/0087* (2013.01); *H04N 5/2254* (2013.01); *H04N 5/23232* (2013.01); *H04N 5/23245* (2013.01); *H04N 5/3696* (2013.01)

(58) Field of Classification Search
CPC .............. G02B 5/1842; G02B 27/0068; G02B 27/0087; G02B 5/1871; G02B 27/0037; H04N 5/23229; H04N 5/3696; H04N 5/2254; H04N 5/23232; H04N 5/23245; G06T 2200/21
See application file for complete search history.

(56) References Cited

U.S. PATENT DOCUMENTS

| | | | |
|---|---|---|---|
| 2009/0095912 A1 | 4/2009 | Slinger et al. | |
| 2009/0201387 A1 | 8/2009 | Ono | |
| 2009/0250594 A1 | 10/2009 | Tanaka et al. | |
| 2009/0303559 A1 | 12/2009 | Rosen et al. | |
| 2011/0085051 A1* | 4/2011 | Chi .................. | H04N 5/2254 348/222.1 |
| 2013/0038749 A1 | 2/2013 | Hatakeyama et al. | |

(Continued)

FOREIGN PATENT DOCUMENTS

| | | |
|---|---|---|
| CN | 101228460 A | 7/2008 |
| CN | 101534391 A | 9/2009 |

(Continued)

OTHER PUBLICATIONS

Chinese-language Office Action issued in counterpart Chinese Application No. 201710828127.6 dated Sep. 10, 2019 (nine (9) pages).

*Primary Examiner* — Yogesh K Aggarwal
(74) *Attorney, Agent, or Firm* — Crowell & Moring LLP

(57) ABSTRACT

An imaging device includes: a modulator with a first pattern, which is configured to modulate light intensity; an image sensor configured to convert light passing through the modulator to image data, and output the image data; and an image processing unit configured to restore an image on the basis of cross-correlation operation with the image data and pattern data that represents a second pattern.

15 Claims, 44 Drawing Sheets

(56) References Cited

U.S. PATENT DOCUMENTS

| | | | |
|---|---|---|---|
| 2014/0168458 A1* | 6/2014 | Richards | G06T 3/40 348/222.1 |
| 2014/0184859 A1 | 7/2014 | Sakita et al. | |
| 2014/0253781 A1 | 9/2014 | Gill et al. | |

FOREIGN PATENT DOCUMENTS

| | | |
|---|---|---|
| CN | 102930507 A | 2/2013 |
| CN | 103067664 A | 4/2013 |
| CN | 103916574 A | 7/2014 |
| JP | 2015-115527 A | 6/2015 |

\* cited by examiner

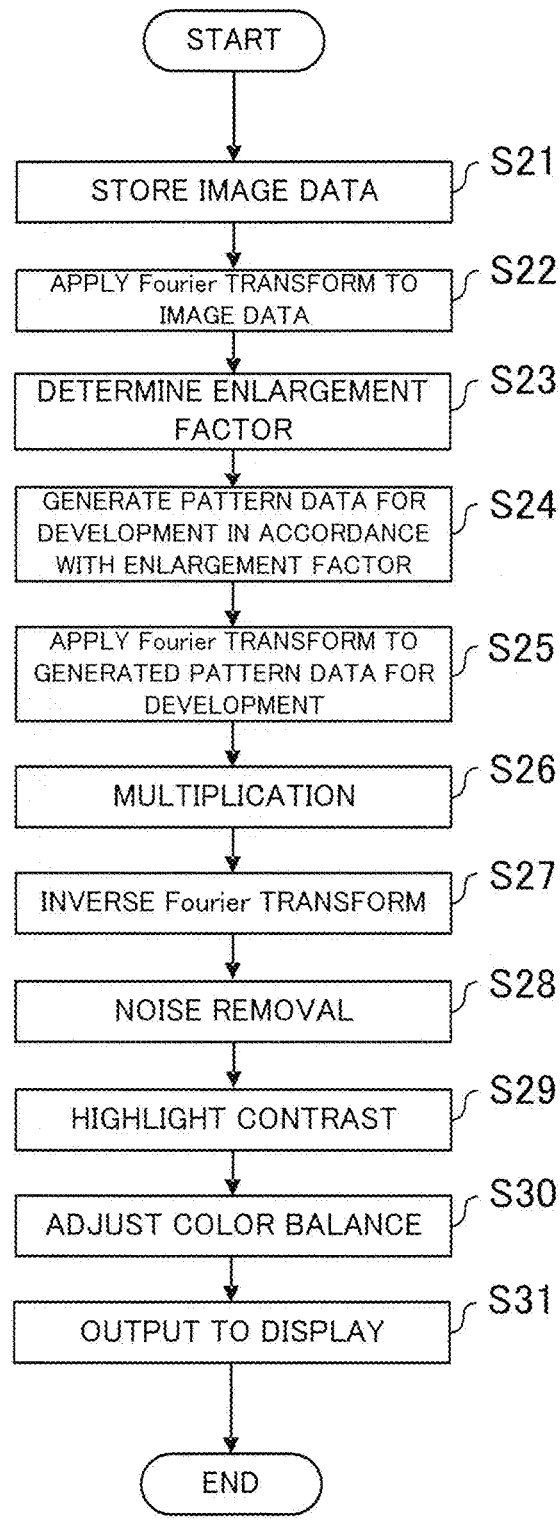

FIG.24

|  | $\Phi_B$ | | | |
|---|---|---|---|---|
|  | 0 | π/2 | π | 3π/2 |
| $\Phi_F$ 0 | ✓ | ✓ | ✓ | ✓ |
| π/2 | ✓ | ✓ | ✓ | ✓ |
| π | ✓ | ✓ | ✓ | ✓ |
| 3π/2 | ✓ | ✓ | ✓ | ✓ |

FIG.25

|  | $\Phi_B$ | | | |
|---|---|---|---|---|
|  | 0 | π/2 | π | 3π/2 |
| $\Phi_F$ 0 | ✓ | | | |
| π/2 | | ✓ | | |
| π | | | ✓ | |
| 3π/2 | | | | ✓ |

FIG.26

|   | $\Phi_B$ | | | |
|---|---|---|---|---|
|   | 0 | π/2 | π | 3π/2 |
| $\Phi_F$ 0 | ✓ | | | |
| π/2 | | ✓ | | |
| π | | | | |
| 3π/2 | | | | |

$\Phi_F, \Phi=0$ $\Phi_F, \Phi=\pi/2$ $\Phi_F, \Phi=\pi$ $\Phi_F, \Phi=3\pi/2$ $\Phi_F, \Phi=0$
$\Phi_F, \Phi=\pi/2$
$\Phi_F, \Phi=\pi$
$\Phi_F, \Phi=3\pi/2$

IMAGING DEVICE AND IMAGING METHOD

CLAIM OF PRIORITY

This application claims the priority based on the Japanese Patent Application No. 2016-196270 filed on Oct. 4, 2016. The entire contents of which are incorporated herein by reference for all purpose.

BACKGROUND

Technical Field

The present invention relates to an imaging device and an imaging method.

Related Art

There is a need for digital cameras mounted on smartphones and the like to be reduced in thickness. Techniques for reduction in thickness for this type of digital cameras include, for example, techniques for obtaining object images without the use of any lens (see the U.S. Patent Application Publication No. 2014/0253781, for example).

According to the U.S. Patent Application Publication No. 2014/0253781, a grating pattern is formed at the upper surface of a substrate attached onto an image sensor. This grating pattern is a special pattern such as a spiral pattern. Further, according to the U.S. Patent Application Publication No. 2014/0253781, for image development, an inverse problem is solved from a projection pattern received by the image sensor. There is a problem of requiring a large operation quantity for solving the inverse problem.

SUMMARY

Therefore, an object of the present invention is to provide a technology for reducing the operation quantity associated with development processing.

The present application encompasses more than one means for solving at least part of the problem mentioned above, and an example of the means will be given as follows. In order to solve the problem mentioned above, an imaging device according to an aspect of the present invention includes: a modulator with a first pattern, which is configured to modulate light intensity; an image sensor configured to convert light passing through the modulator to image data, and output the image data; and an image processing unit configured to restore an image on the basis of cross-correlation operation with the image data and pattern data that represents a second pattern.

According to the present invention, the operation quantity associated with development processing can be reduced. Objects, configurations, and advantageous effects other than the foregoing will be evident from the following description of embodiments.

BRIEF DESCRIPTION OF DRAWINGS

FIG. 22 is a flowchart showing an operation example of an imaging device;

FIG. 24 is a diagram No. 1 showing examples of initial phase combinations in fringe scan;

FIG. 25 is a diagram No. 2 showing examples of initial phase combinations in fringe scan;

FIG. 26 is a diagram No. 3 showing examples of initial phase combinations in fringe scan;

DETAILED DESCRIPTION

Figure 1:
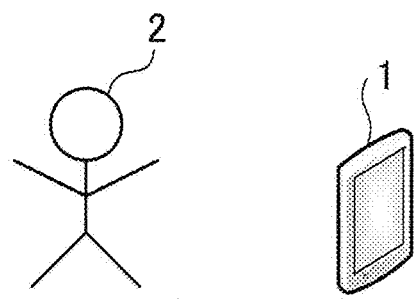
FIG. 1 is a diagram illustrating an example of a mobile terminal obtained by applying an imaging device according to a first embodiment.

In the following embodiments, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations.

In addition, in the following embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the following embodiments, obviously, the constituent elements (also including elemental steps) are not necessarily to be considered indispensable, unless expressly stated otherwise, and unless considered obviously indispensable in principle.

Likewise, in the following embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above.

In addition, throughout all of the drawings for the explanation of embodiments, the same members are denoted by the same reference numerals in principle, and repeated descriptions thereof will be omitted. Embodiments of the present invention will be described below with reference to the drawings.

First Embodiment

FIG. 1 is a diagram illustrating an example of a mobile terminal obtained by applying an imaging device according to a first embodiment. The mobile terminal 1 shown in FIG. 1 is, for example, a smartphone. FIG. 1 shows a subject 2 in addition to the mobile terminal 1.

The mobile terminal 1 has an imaging device (not shown). The mobile terminal 1 includes a display, and represents, on the display, a subject imaged by the imaging device.

The imaging device provided in the mobile terminal 1 is a lensless camera. More specifically, the imaging device provided in the mobile terminal 1 captures an image of the external subject 2 without using any lens for imaging. Thus, the mobile terminal 1 can be reduced in size, thickness, and weight.

Figure 2:
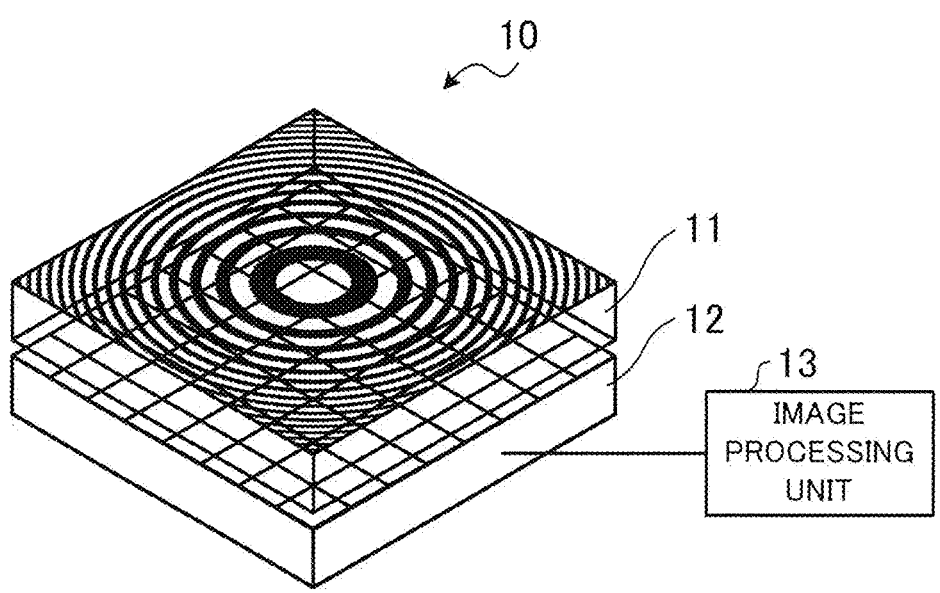
FIG. 2 is a diagram illustrating a configuration example of an imaging device provided in the mobile terminal.

FIG. 2 is a diagram illustrating a configuration example of the imaging device provided in the mobile terminal 1. As shown in FIG. 2, the imaging device 10 has a modulator 11, an image sensor 12, and image processing unit 13.

The modulator 11 has, for example, a concentric pattern formed. The intensity of light that passes through the modulator 11 is modulated by the concentric pattern formed at the modulator 11, and received by the image sensor 12. The modulator 11 is fixed in close contact with the light-receiving surface of the image sensor 12.

The image sensor 12 converts the light passing through the modulator 11 to image data, and outputs the image data to the image processing unit 13.

The image processing unit 13 restores the image of the subject 2 on the basis of cross-correlation operation with the image data output from the image sensor 12 and pattern data which represents a predetermined pattern.

The pattern data for developing the image of the subject 2 from the image data of the image sensor 12 is stored in advance in a storage device (not shown). The pattern data refers to, for example, image data that has a pattern similar to the pattern of the modulator 11 (the concentric pattern shown in FIG. 2). Hereinafter, the pattern data may be referred to as pattern data for development.

The image restored by the image processing unit 13 is displayed on, for example, a display (not shown) provided in the mobile terminal 1.

Figure 3:
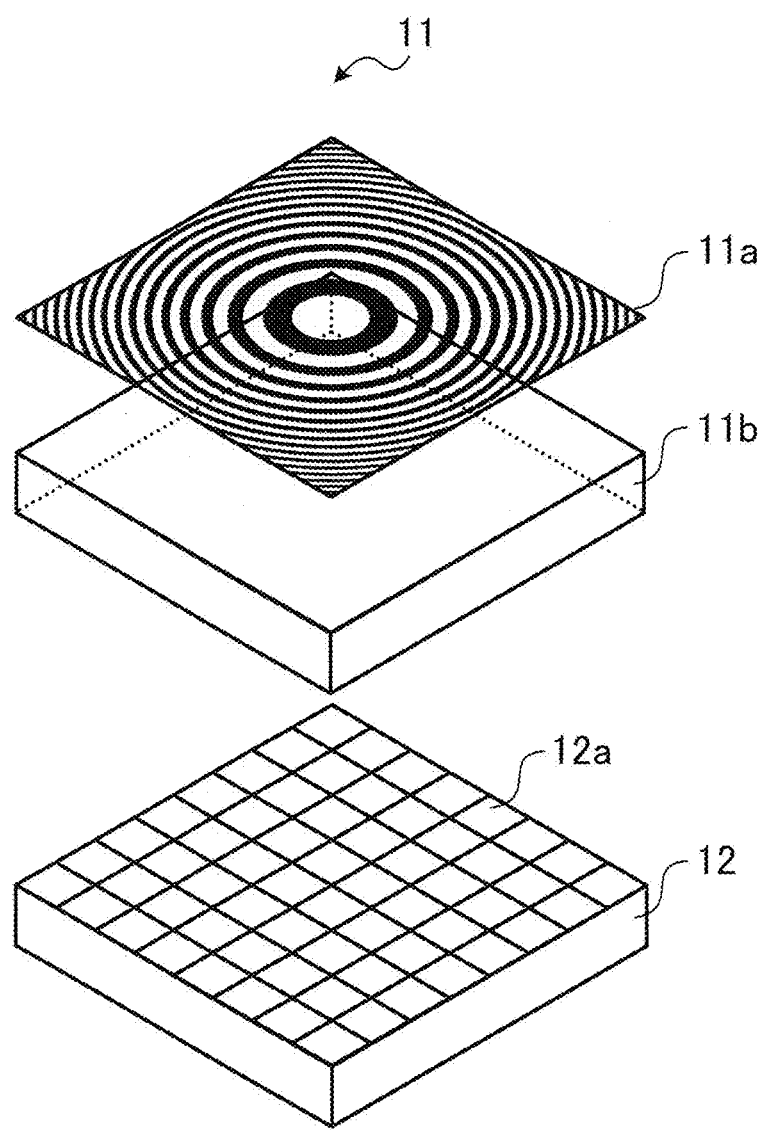
FIG. 3 is a diagram illustrating a modulator and an image sensor.

FIG. 3 is a diagram illustrating the modulator 11 and the image sensor 12. In FIG. 3, the same elements as those in FIG. 2 are denoted by the same reference numerals. As shown in FIG. 3, the modulator 11 has a pattern 11a and a substrate 11b.

The pattern 11a has a concentric shape. The interval (pitch) of pattern 11a is narrowed from the center outwardly. Specifically, the interval of the pattern 11a is narrowed in inverse proportion to the radius from the center.

The pattern 11a is formed, for example, through vapor deposition of a metal such as aluminum or chromium on the substrate 11b by a sputtering method or the like for use in semiconductor processes. The pattern 11a is formed by the contrast between the pattern with aluminum or the like vapor-deposited and the pattern with nothing vapor-deposited.

It is to be noted that the pattern 11a is not to be considered limited thereto, but for example, the contrast may be formed, for example, by printing or the like with an ink-jet printer or the like. More specifically, the pattern 11a may be formed by any means as long as the means can achieve the modulation of the transmission.

The substrate 11b is formed from a material that is transparent to visible light, for example, such as glass or plastics, when the imaging device 10 is used for shooting with visible light. On the other hand, when the imaging device 10 is used for shooting with far-infrared rays, the substrate 11b is formed from a material that is transparent to far-infrared rays, for example, such as germanium, silicon, or chalcogenide. More specifically, any material that is transparent to a wavelength intended for shooting may be used for the substrate 11b. In addition, any material that blocks a wavelength intended for shooting may be used for the pattern 11a.

The image sensor 12 is, for example, a CCD (Charge Coupled Device) image sensor or a CMOS (Complementary Metal Oxide Semiconductor) image sensor. The surface of the image sensor 12 has pixels 12a as light-receiving elements arranged regularly in a grid-like form. The image sensor 12 converts optical images received by the pixels 12a to image signals (image data) as electrical signals.

Another example of the modulator 11 and image sensor 12 will be described.

Figure 4:
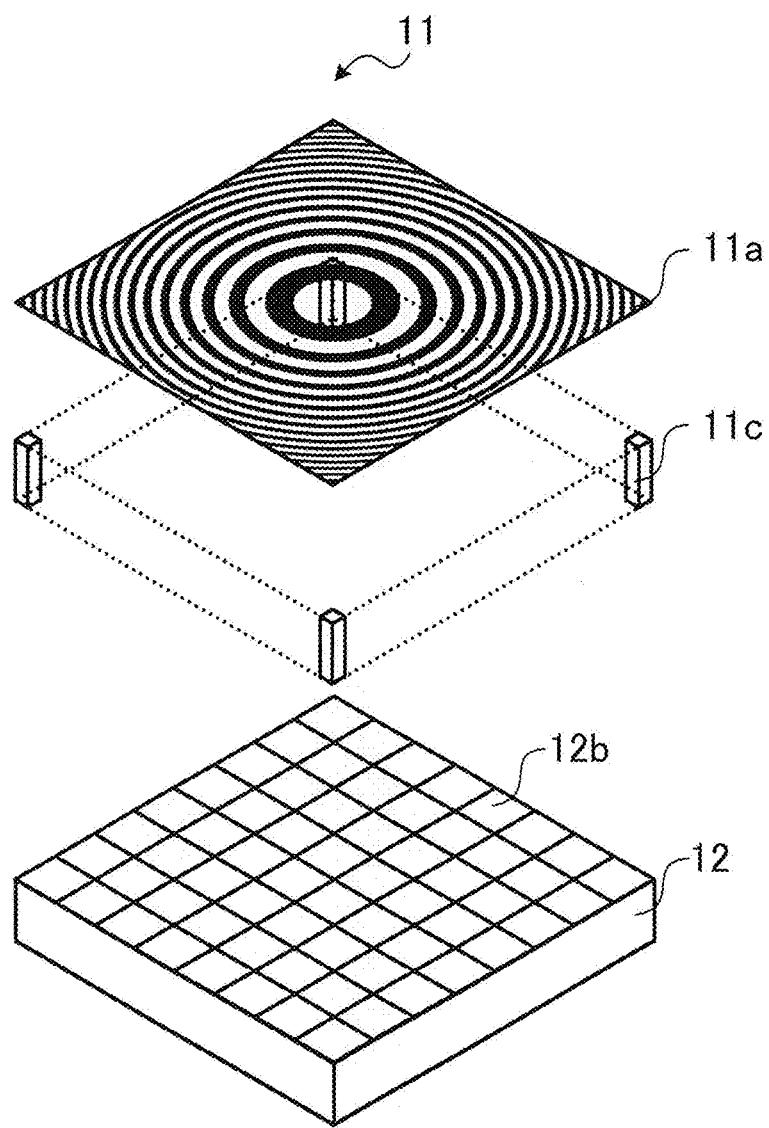
FIG. 4 is a diagram illustrating another example of the modulator and image sensor.

FIG. 4 is a diagram illustrating another example of the modulator 11 and image sensor 12. In FIG. 4, the same elements as those in FIG. 3 are denoted by the same reference numerals.

In the example of FIG. 4, a pattern 11a is formed in a thin film. The thin film with the pattern 11a formed is provided with four supporting members 11c, so as to be opposed to an image sensor 12. The modulator 11 and the image sensor 12 may be formed as shown in FIG. 4. It is to be noted that hereinafter, unless otherwise noted, the modulator 11 and the image sensor 12 are adapted to have the structure shown in FIG. 3.

The shooting principle of the imaging device 10 will be described. The concentric pattern with a pitch made fine in inverse proportion to the radius from the center is defined as follows.

First, assume a case of interference between a spherical wave close to a plane wave and a plane wave for use as reference light in a laser interferometer or the like. When the radius from the reference coordinate as the center of the concentric circle is denoted by "r", and in that regard, the phase of a spherical wave is denoted by "φ(r)", the phase "φ(r)" is expressed by the following formula (1) with the use of a coefficient β that determines the magnitude of a wave-front curvature.

[Mathematical Formula 1]

$$\phi(r)=\beta r^2 \quad (1)$$

The expression with the square of the radius "r" in spite of the spherical wave is adopted because approximation is possible only with the lowest order of the expansion owing to the spherical wave close to a plane wave. The interference of a plane wave to the light with the foregoing phase distribution provides an intensity distribution of interference fringe as expressed by the following formula (2).

[Mathematical Formula 2]

$$I(r)=\tfrac{1}{2}|\exp i\phi(r)+1|^2=1+\cos\phi=1+\cos\beta r^2 \quad (2)$$

This means a concentric fringe with bright lines, in the case of a radius that meets the following formula (3).

[Mathematical Formula 3]

$$\phi(r)=\beta r^2=2n\pi \quad (n=0,1,2,\dots) \quad (3)$$

When the pitch of the fringe is denoted by "p", the following formula (4) is obtained.

[Mathematical Formula 4]

$$p\frac{d}{dr}\phi(r)=2p\beta r=2\pi,\ p(r)=\frac{\pi}{\beta r} \quad (4)$$

From the formula (4), it is determined that the pitch is narrowed in inverse proportion to the radius "r". The plate (pattern) with such a fringe is referred to as Gabor Zone Plate in the case of a plate where the contrast changes continuously in a sinusoidal manner, and referred to as Fresnel Zone Plate in the case of a plate where the contrast changes in a dual gray scale mode.

Figure 5:
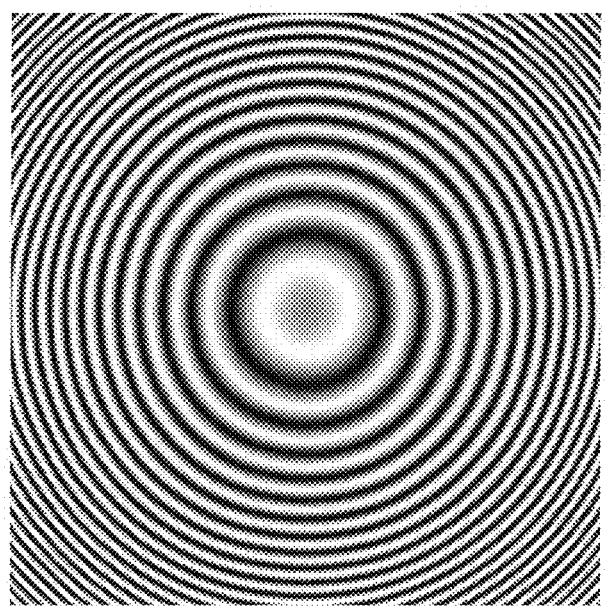
FIG. 5 is a diagram illustrating an example of Gabor Zone Plate.

FIG. 5 is a diagram illustrating an example of Gabor Zone Plate. In Gabor Zone Plate, the contrast of the fringe changes continuously in a sinusoidal manner.

Figure 6:
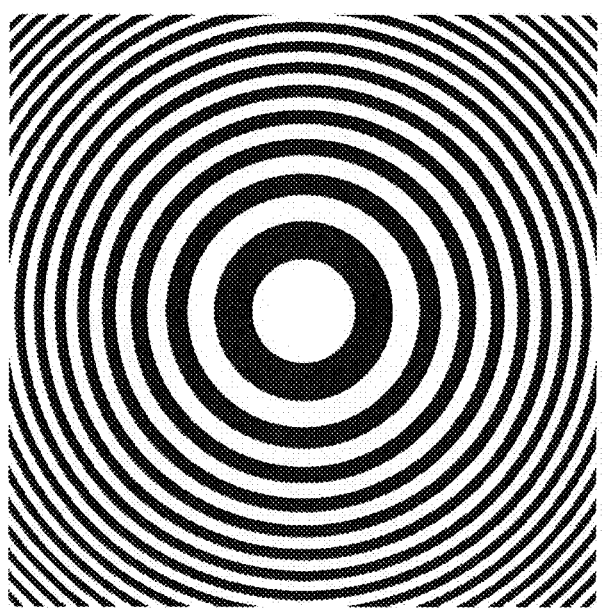
FIG. 6 is a diagram illustrating an example of Fresnel Zone Plate.

FIG. 6 is a diagram illustrating an example of Fresnel Zone Plate. In Fresnel Zone Plate, the contrast of the fringe changes in a dual gray scale mode. Hereinafter, when no distinction is made between Gabor Zone Plate and Fresnel Zone Plate, the plate may be referred to simply as "Zone Plate".

Hereinafter, for the sake of simple explanation, an explanation for only the x-axis direction will be given with mathematical formulas, but also considering the y-axis direction as well makes it possible to see two-dimensional deployment.

Figure 7:
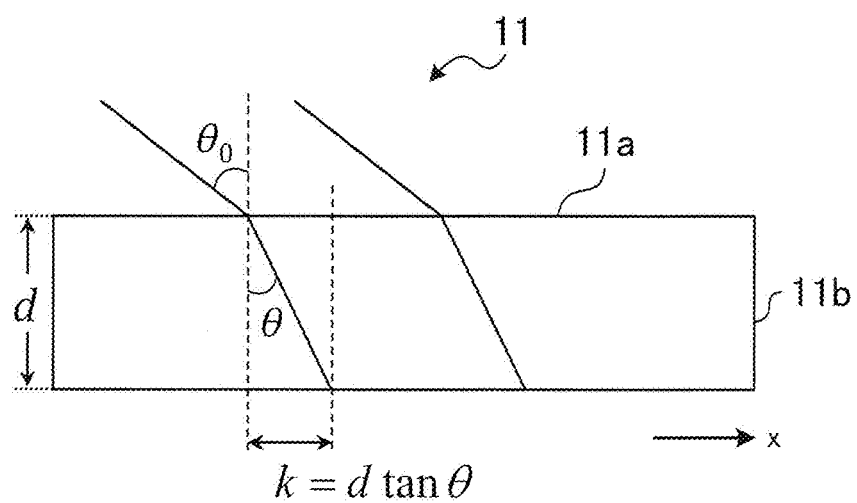
FIG. 7 is a diagram for explaining a projection image onto the image sensor, with light passing through the modulator 11.

FIG. 7 is a diagram for explaining a projection image onto the image sensor 12, with light passing through the modulator 11. FIG. 7 shows therein the pattern 11a and substrate 11b of the modulator 11.

As shown in FIG. 7, assume that parallel light enters at an angle "θ₀" onto the substrate 11b of "d" in thickness with the pattern 11a formed. When the refraction angle in the substrate 11b is denoted by "θ", light multiplied by the transmission of the pattern 11a at the surface enters, just with a "k=d·tan θ" shift, the image sensor 12 in a geometric optical manner. In this case, a projection image with an intensity distribution represented by the following formula (5) is detected in the image sensor 12. It is to be noted that "ΦF" in the following formula (5) represents an initial phase of the interference fringe intensity distribution in accordance with the formula (2).

[Mathematical Formula 5]

$$I_F(x)=1+\cos[\beta(x+k)^2+\Phi_F] \quad (5)$$

The image processing unit 13 obtains a developed image by cross-correlation operation with the projection image (image data output from the image sensor 12) represented by the formula (5) and the pattern data for development, stored in advance in the storage device. The pattern of the pattern data for development has a pattern similar to a zone plate formed at the modulator 11, which is represented by the following formula (6), when the initial phase is denoted by "ΦB".

[Mathematical Formula 6]

$$I_B(x)=\cos(\beta x^2+\Phi_B) \quad (6)$$

The pattern data for development is data for use in signal processing. Therefore, there is no need to offset the pattern of the pattern data for development at "1" as in the formula (5), but the pattern may have a negative value.

Figure 8:
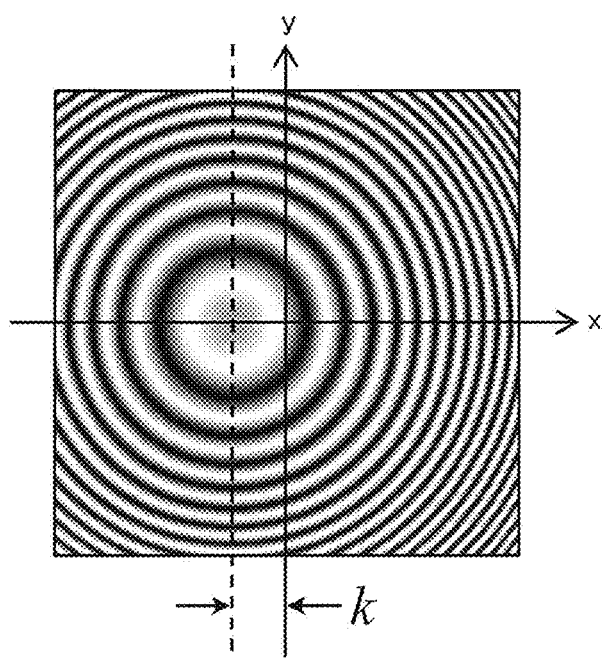
FIG. 8 is a diagram illustrating an example of a projection image projected onto an image sensor.

FIG. 8 is a diagram illustrating an example of a projection image projected onto the image sensor 12. The light entering the modulator 11 is projected, with a k shift, onto the image sensor 12 as represented by the formula (5).

Figure 9:
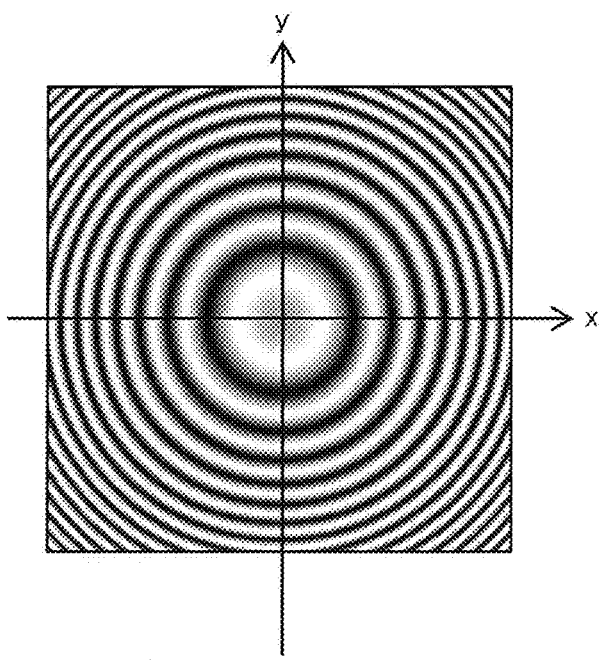
FIG. 9 illustrates a pattern example of the pattern data for development stored in the storage device.

FIG. 9 illustrates a pattern example of the pattern data for development stored in the storage device. The image processing unit 13 causes the storage device to store therein, for example, pattern data for development with the pattern shown in FIG. 9.

Figure 10:
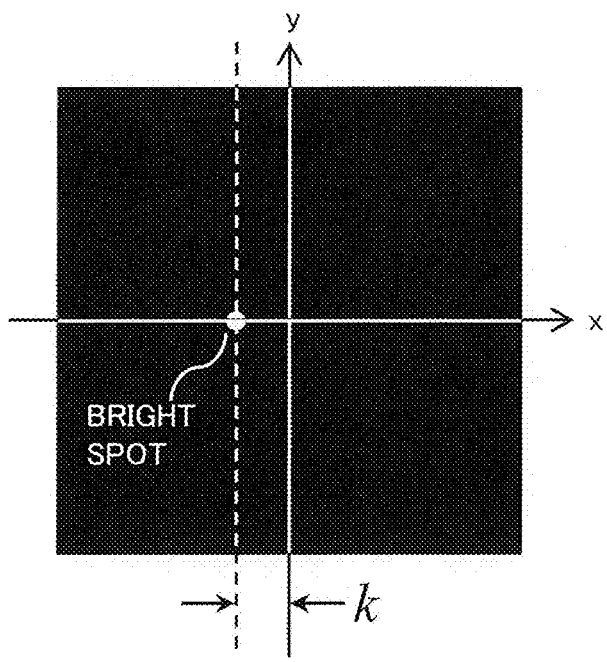
FIG. 10 a diagram illustrating an example of a developed image obtained by cross-correlation operation.

FIG. 10 is a diagram illustrating an example of a developed image obtained by cross-correlation operation. The image processing unit 13 carries out a cross-correlation operation with the image data output from the image sensor 12 and the pattern data for development stored in advance in the storage device as mentioned above. For example, the image processing unit 13 obtains a developed image (bright spot) as shown in FIG. 10 by cross-correlation operation with the image data of the projection image shown in FIG. 8 and the pattern data for development stored in advance in the storage device as shown in FIG. 9. More specifically, the image processing unit 13 obtains a bright spot with a shift amount "k" by cross-correlation operation with the projection image (the image data output from the image sensor 12) on the image sensor 12 as represented by the formula (5) and the pattern data for development as represented by the formula (6), stored in the storage device.

Examples of the cross-correlation operation include convolution operation. For example, the image processing unit 13 obtains a two-dimensional developed image by two-dimensional convolution operation with the image data output from the image sensor 12 and the pattern data for development, stored in advance in the storage device.

The angle of view of the imaging device 10 will be described.

Figure 11:
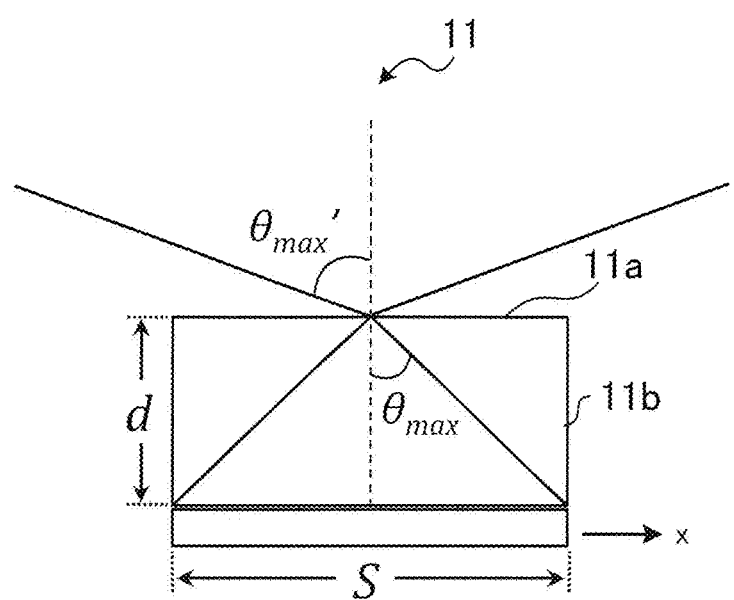
FIG. 11 is a diagram for explaining the angle of view of an imaging device.

FIG. 11 is a diagram for explaining the angle of view of the imaging device 10. FIG. 11 shows therein the pattern 11a and substrate 11b of the modulator 11.

The maximum angle of the incidence angle of parallel light that can be detected by the imaging device 10 is denoted by "θmax". The maximum angle "θmax" refers to, as shown in FIG. 11, an angle of a light beam connecting the center of the pattern 11a and an end of the lower surface of the substrate 11b (an end of the image sensor 12), which is represented by the following formula (7).

[Mathematical Formula 7]

$$\theta_{max} = \tan^{-1}\left(\frac{S}{2d}\right) \quad (7)$$

It is to be noted that the maximum angle "θmax" also refers to an angle that is obtained when the peak of the cross-correlation operation with the projection image on the image sensor 12 and the pattern data for development appears at the end of the image sensor 12.

Analogically with imaging through the use of a common lens, when parallel light with the angle of view "θmax" is considered focused on the end of the image sensor 12 and received, the effective focal length of the imaging device 10 without the use of any lens is represented by the following formula 8.

[Mathematical Formula 8]

$$f_{\text{eff}} = \frac{S}{2 \tan \theta_{max}} = d \quad (8)$$

In this regard, it is determined from the formula (7) that it is possible to change the angle of view depending on the thickness "d" of the modulator 11. Therefore, the imaging device 10 can also do the shooting with the angle of view changed during the shooting, as long as the modulator 11 has, for example, the configuration as shown in FIG. 4, and has the function of being capable of changing the length of the supporting members 11c.

The correspondence relationship between the parallel light described above and light from an actual object will be described.

Figure 12:
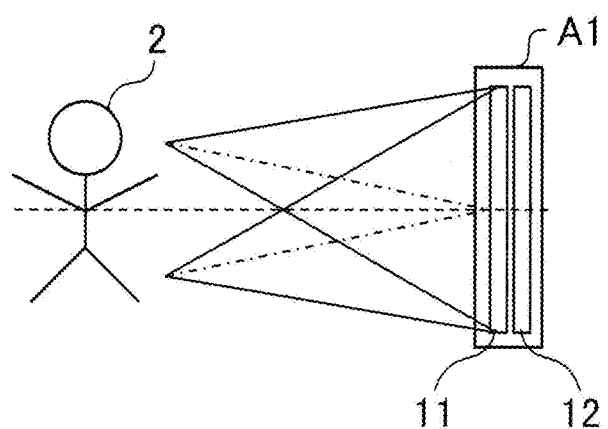
FIG. 12 is a diagram for explaining an angle made by light from each point of an object with respect to an image sensor 12.

FIG. 12 is a diagram for explaining an angle made by light from each point of an object with respect to the image sensor 12. FIG. 12 shows therein a subject 2, the modulator 11, and the image sensor 12. In FIG. 12, the modulator 11 and the image sensor 12 are referred to as an image sensor integrated substrate A1.

Light from each point of the subject 2 enters the image sensor integrated substrate A1, strictly as a spherical wave from a point light source. When the image sensor integrated substrate A1 is sufficiently small or sufficiently far away with respect to the subject 2, the incidence angle of light illuminating the image sensor integrated substrate A1 from each point can be regarded as the same angle. Accordingly, the imaging device 10 is capable of shooting objects at infinity under the condition as mentioned previously.

The operation of the image processing unit 13 will be described.

Figure 13:
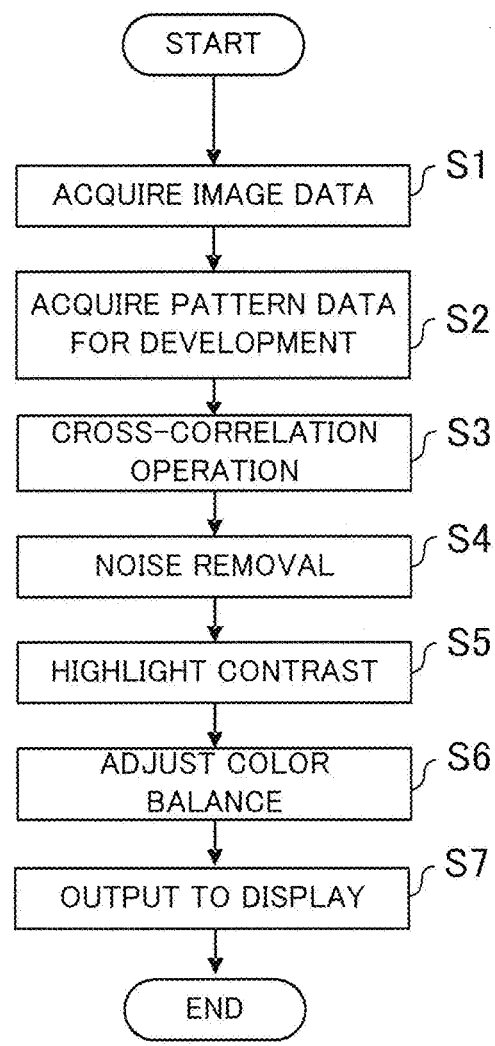
FIG. 13 is a flowchart showing an operation example of an imaging device.

FIG. 13 is a flowchart showing an operation example of the imaging device 10. The imaging device 10 starts the processing in the flowchart shown in FIG. 13, for example, when a shutter button of the mobile terminal 1 is pressed by a user.

First, the image processing unit 13 acquires image data shot by the image sensor 12 (step S1).

Next, the image processing unit 13 acquires pattern data for development, stored in the storage device (step S2).

Next, the image processing unit 13 carries out a cross-correlation operation with the image data of the image sensor 12, which is acquired in the step S1, and the pattern data for development, stored in the storage device, which is acquired in the step S2 (step S3). For example, the image processing unit 13 carries out a two-dimensional convolution operation as the cross-correlation operation.

Next, the image processing unit 13 removes noises of the image data (the image data for a developed image) calculated in the step S3 (step S4).

Next, the image processing unit 13 highlights the contrast of the image data with noises removed therefrom in the step S4 (step S5).

Next, the image processing unit 13 adjusts the color balance of the image data subjected to the processing for highlighting the contrast in the step S5 (step S6).

Next, the image processing unit 13 outputs, to the display of the mobile terminal 1, the image data subjected to the color balance adjustment in the step S6 (step S7).

In accordance with the foregoing processing, the subject 2 shot by the mobile terminal 1 is displayed on the display of the mobile terminal 1.

Figure 14:
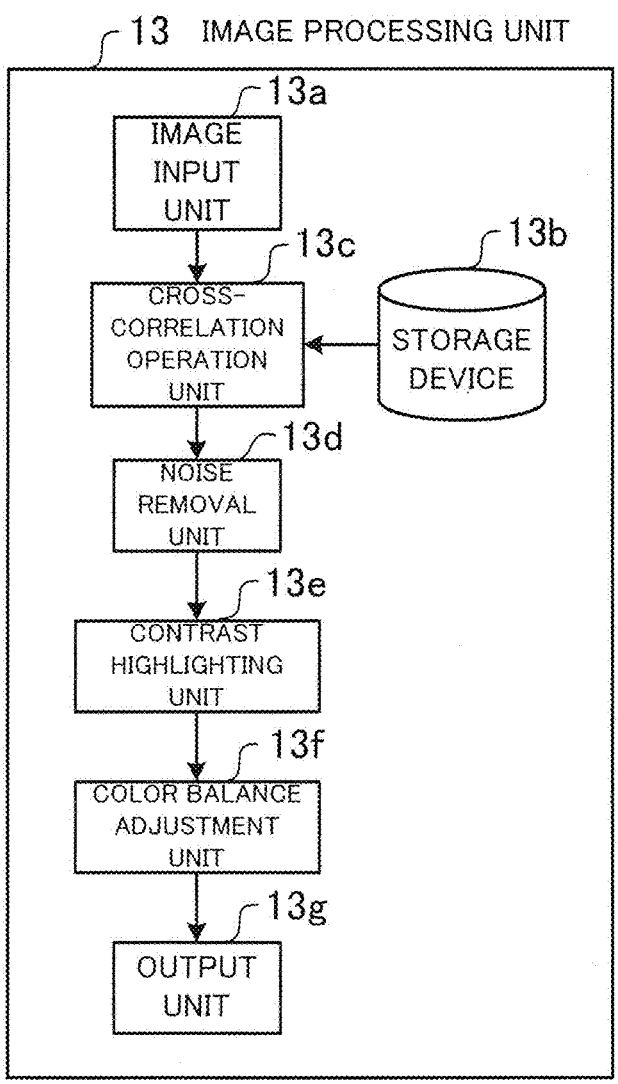
FIG. 14 is a diagram illustrating a functional block configuration example of an image processing unit.

FIG. 14 is a diagram illustrating a functional block configuration example of the image processing unit 13. As shown in FIG. 14, the image processing unit 13 has an image input unit 13a, a storage device 13b, a cross-correlation operation unit 13c, a noise removal unit 13d, a contrast highlighting unit 13e, a color balance adjustment unit 13f, and an output part 13g. The respective functions shown in FIG. 14 may be achieved through the execution of a program by a CPU (Central Processing Unit), or achieved with hardware such as a logic circuit.

The image input unit 13a inputs image data output from the image sensor 12.

Pattern data for development, which has a pattern similar to the pattern 11a formed at the modulator 11, is stored in advance in the storage device 13b.

The cross-correlation operation unit 13c carries out a cross-correlation operation with the image data input by the image input unit 13a and the pattern data for development, stored in the storage device 13b. For example, the cross-correlation operation unit 13c carries out a two-dimensional convolution operation with the image data input by the image input unit 13a and the pattern data for development, stored in the storage device 13b.

The noise removal unit 13d removes noises of the image data subjected to the operation by the cross-correlation operation unit 13c.

The contrast highlighting unit 13e highlights the contrast of the image data with the noises removed therefrom by the noise removal unit 13d.

The color balance adjustment unit 13f adjusts the color balance of the image data with the contrast highlighted by the contrast highlighting unit 13e.

The output unit 13g outputs, to the display, the image data with the color balance adjusted by the color balance adjustment unit 13f.

As described above, the modulator 11 of the imaging device 10 has the pattern 11a, which modulates the light intensity. The image sensor 12 converts light passing through the modulator 11 to image data, and outputs the image data. Then, the image processing unit 13 restores the image on the basis of the cross-correlation operation with the image data output from the image sensor 12 and the pattern data for development, which represents a predetermined pattern. For example, the image processing unit 13 restores the image on the basis of convolution operation with the image data output from the image sensor 12 and the pattern data for development.

Thus, the imaging device 10 can reduce the operation quantity associated with the development processing. For example, the imaging device 10 can reduce the operation quantity as an imaging device that calculates the incidence angle of incident light through an inverse problem, from a projection pattern generated on an image sensor with light passing through a grid substrate.

In addition, the imaging device 10 reduces the operation quantity, thus making it possible to shorten the amount of time to displaying an image on the display.

In addition, the imaging device 10 reduces the operation quantity, thus making it possible to reduce the cost and the power consumption, without the need for the use of any high-performance CPU.

It is to be noted that while the example of applying the imaging device 10 to the mobile terminal 1 has been described above, the imaging device 10 can be also applied to other electronic devices such as digital cameras.

In addition, the light beams entering the imaging device 10 has only one incidence angle at the same time in the foregoing. However, in order for the imaging device 10 to work actually as a camera, a case has to be assumed where light at multiple incidence angles enters the imaging device 10 at the same time. At a time when light at such multiple incidence angles enters the image sensor 12, images in already multiple patterns 11a will be superimposed on one another. However, under illumination with a common light source, the incidence light is incoherent, without influencing each other, and can be thus considered independently.

In addition, the pattern data for development is supposed to be stored in advance in the storage device 13b, but not limited thereto. The image processing unit 13 may generate pattern data for development on the basis of the formula (6), when the subject 2 is shot.

In addition, the transmission distribution represented by the formula (2) is supposed to have fundamentally sinusoidal characteristics, but has only to include such a component as a fundamental frequency component for the pattern 11a.

Figure 15:
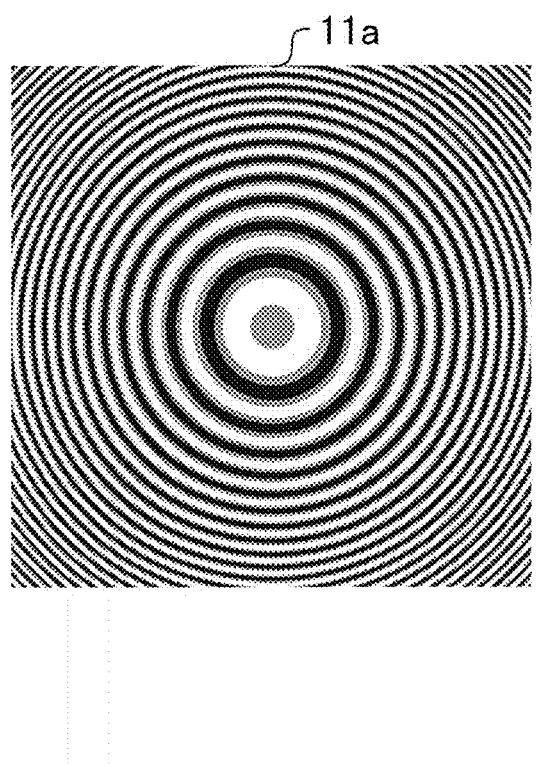
FIG. 15 is a diagram illustrating an example of a ternary pattern.

FIG. 15 is a diagram illustrating an example of a ternary pattern 11a. As shown in FIG. 15, the transmission of the pattern 11a may be ternary. Thus, the pattern 11a can be prepared with three types of transmissions, and the difficulty with the preparation can be thus lowered.

Figure 16:
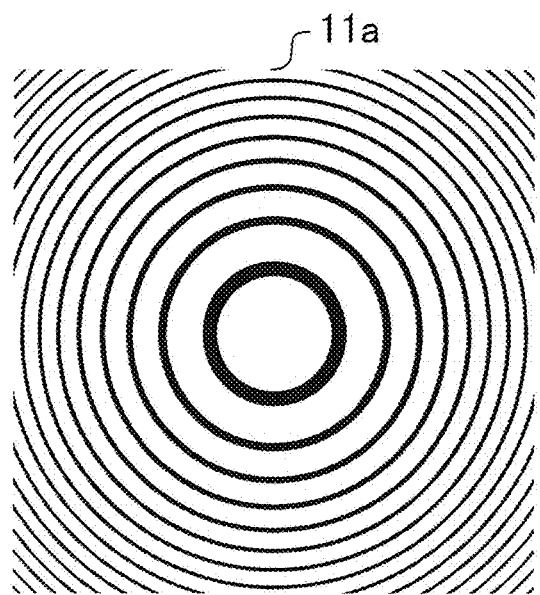
FIG. 16 is a diagram illustrating an example of a pattern 11a where the duty ratio is changed between a high-transmission part and a low-transmission part

FIG. 16 is a diagram illustrating an example of a pattern 11a where the duty ratio is changed between a high-transmission part and a low-transmission part. As shown in FIG. 16, for the pattern 11a, the high-transmission part may be larger than the low-transmission part. Thus, the imaging device 10 achieves effects such as suppressed diffraction from the pattern 11a, thereby making it possible to reduce deterioration of shot images.

Second Embodiment

According to a second embodiment, Fourier transform is used as the cross-correlation operation. This reduces the operation quantity more than the convolution operation. An imaging device according to the second embodiment has the same configuration as the imaging device 10 shown in FIG. 2, but partially differs therefrom in the function of the image processing unit 13. The difference from the first embodiment will be described below.

According to the second embodiment, an image processing unit 13 applies Fourier transform to image data output from an image sensor 12. More specifically, the image processing unit 13 applies Fourier transform to the formula (5) mentioned above. The application of the Fourier transform to the formula (5) provides a result as represented by the following formula (9).

[Mathematical Formula 9]

$$\mathcal{F}[I_F(x)] = \delta(u) + \frac{e^{-iku}}{2\sqrt{\pi\beta}}\sin\left(\frac{u^2}{4\beta} - \Phi_F + \frac{\pi}{4}\right) \qquad (9)$$

Pattern data for development, subjected to Fourier transform, is stored in advance in a storage device provided in the image processing unit 13. More specifically, data obtained by applying Fourier transform to the formula (6) mentioned above is stored in the storage device. The application of the Fourier transform to the formula (6) provides a result as represented by the following formula (10).

[Mathematical Formula 10]

$$\mathcal{F}[I_B(x)] = \frac{1}{2\sqrt{\pi\beta}}\sin\left(\frac{u^2}{4\beta} - \Phi_B + \frac{\pi}{4}\right) \qquad (10)$$

The "F" shown in the formula (9) and the formula (10) represents an operation for Fourier transform, and the "u" therein represents a frequency coordinate in the X-axis direction. The "δ" in the formula (9) represents a delta function.

An important matter in the formula (9) and the formula (10) is that the formulas subjected to the Fourier transform also correspond to a zone plate. More specifically, the image processing unit 13 can obtain a developed image by the action of the pattern data for development, subjected to the Fourier transform, on the image data subjected to the Fourier transform. The multiplication of the formula (9) by the formula (10) provides a result as represented by the following formula (11).

[Mathematical Formula 11]

$$\mathcal{F}[I_F(x)] \cdot \mathcal{F}[I_B(x)] = \frac{1}{2\sqrt{\pi\beta}} \sin\left(\frac{\pi}{4} - \Phi_B\right)\delta(u) + \frac{e^{-iku}}{8\pi\beta} \cdot \left[\sin\left(\frac{u^2}{4\beta} - \Phi_B + \frac{\pi}{4}\right)\sin\left(\frac{u^2}{4\beta} - \Phi_F + \frac{\pi}{4}\right)\right] \quad (11)$$

The term "exp(−iku)" represented by an exponential function in the formula (11) refers to a signal component, and the inverse Fourier transform of the term provides a result as represented by the following formula (12).

[Mathematical Formula 12]

$$\mathcal{F}^{-1}[e^{-iku}] = 2\pi\delta(x+k) \quad (12)$$

From the formula (12), a bright spot can be obtained in the location of "k" on the original x axis (see FIG. 10). This bright spot indicates a light flux at infinity, which is nothing more or less than a shot image obtained from the image processing unit 13.

As just described, the image processing unit 13 applies Fourier transform to the image data output from the image sensor 12, and multiplies the image data subjected to the Fourier transform by the pattern data for development, subjected to Fourier transform, which is stored in advance in the storage device, thereby making it possible to obtain a developed image. Further, the image processing unit 13 can thus reduce the operation quantity, because the use of Fourier transform leads to the multiplication operation for the operation of obtaining a developed image.

It is to be noted that in the "sin" expression in the second term of the right-hand side of the formula (11), the initial phase of the "sin" expression becomes "0" in the case of ΦF=ΦB=π/4. Furthermore, the first term of the right-hand side of the formula (11) becomes "0", thereby making it possible to reduce the terms which are not required for development. Development processing under this condition allows the image processing unit 13 to obtain a developed image with fewer noises.

Figure 17:
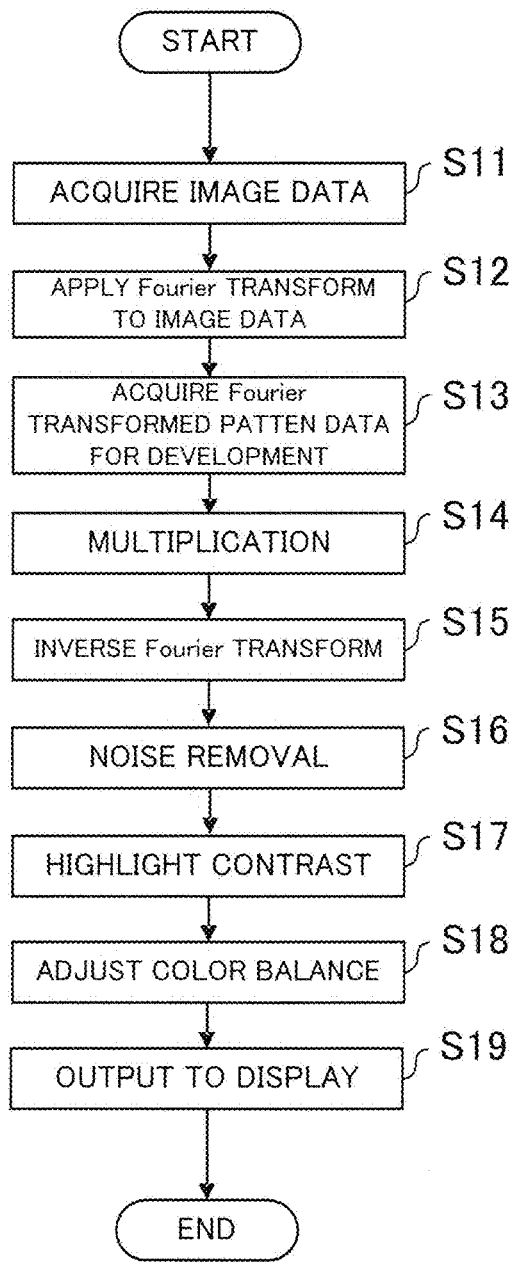
FIG. 17 is a flowchart showing an operation example of an imaging device according to a second embodiment.

FIG. 17 is a flowchart showing an operation example of the imaging device 10 according to the second embodiment. The imaging device 10 starts the processing in the flowchart shown in FIG. 17, for example, when a shutter button of the mobile terminal 1 is pressed by a user.

First, the image processing unit 13 acquires image data shot by the image sensor 12 (step S11).

Next, the image processing unit 13 applies Fourier transform to the image data acquired in the step S11 (step S12).

Next, the image processing unit 13 acquires pattern data for development, subjected to Fourier transform, which is stored in the storage device (step S13).

Next, the image processing unit 13 multiplies the image data subjected to the Fourier transform in the step S12 by the pattern data for development, subjected to the Fourier transform, which is acquired in the step S13 (step S14).

Next, the image processing unit 13 applies inverse Fourier transform to the data obtained by the multiplication in the step S14 (step S15).

The processing from a step S16 to a step 19 is configured in the same fashion as the step S4 to the step S7 described with reference to FIG. 13, and the description thereof will be omitted.

In accordance with the foregoing processing, a subject 2 shot by the mobile terminal 1 is displayed on the display of the mobile terminal 1.

Figure 18:
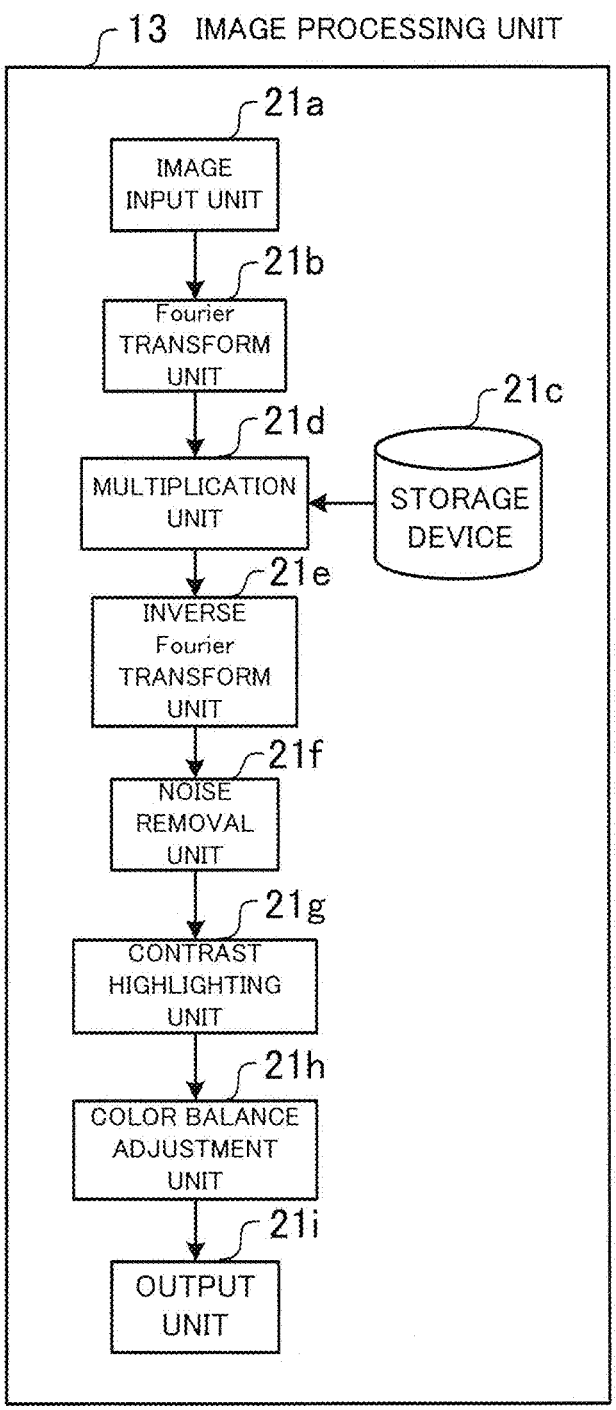
FIG. 18 is a diagram illustrating a functional block configuration example of an image processing unit.

FIG. 18 is a diagram illustrating a functional block configuration example of the image processing unit 13. As shown in FIG. 18, the image processing unit 13 has an image input unit 21a, a Fourier transform unit 21b, a storage device 21c, a multiplication unit 21d, an inverse Fourier transform unit 21e, a noise removal unit 21f, a contrast highlighting unit 21g, a color balance adjustment unit 21h, and an output part 21i. The respective functions shown in FIG. 18 may be achieved through the execution of a program by a CPU, or achieved with hardware such as a logic circuit.

The image input unit 21a inputs image data output from the image sensor 12.

The Fourier transform unit 21b applies Fourier transform to the image data input by the image input unit 21a. The Fourier transform unit 21b applies, for example, through FFT (Fast Fourier Transform), Fourier transform to the image data input by the image input unit 21a.

Pattern data for development, subjected to Fourier transform in advance, is stored in the storage device 21c.

The multiplication unit 21d multiplies the image data subjected to the Fourier transform by the Fourier transform unit 21b, by the pattern data for development, subjected to the Fourier transform, which is stored in the storage device 21c.

The inverse Fourier transform unit 21e applies inverse Fourier transform to the multiplication result obtained from the multiplication unit 21d. The inverse Fourier transform unit 21e applies, for example, through IFFT (Inverse Fast Fourier Transform), inverse Fourier transform to the multiplication result obtained from the multiplication unit 21d.

The noise removal unit 21f, the contrast highlighting unit 21g, the color balance adjustment unit 21h, and the output part 21i are configured in the same fashion as the noise removal unit 13d, contrast highlighting unit 13e, color balance adjustment unit 13f, and output unit 13g shown in FIG. 14, and the descriptions thereof will be omitted.

As described above, the image processing unit 13 of the imaging device 10 obtains a developed image on the basis of the multiplication operation with the Fourier transformed image data and the Fourier transformed pattern data for development. Thus, the imaging device 10 can make a further reduction in operation quantity.

It is to be noted that the FFT as an example has been described as a method for carrying out the cross-correlation operation through Fourier transform, without limitation thereto. For example, the imaging device 10 may use discrete cosine transform (DCT: Discrete Cosine Transform) or the like, thereby also making it possible to further reduce the operation quantity.

Third Embodiment

Shooting an object at infinity has been described in the first embodiment and the second embodiment. Shooting an object at a finite distance will be described in a third embodiment.

Figure 19:
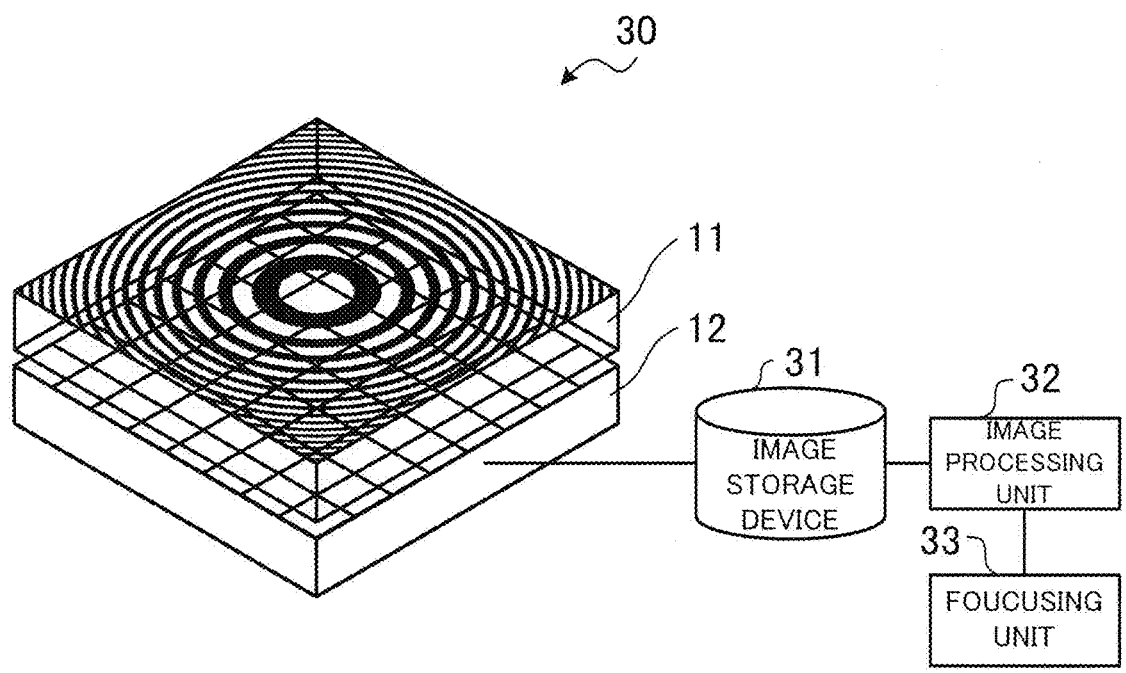
FIG. 19 is a diagram illustrating a configuration example of an imaging device according to a third embodiment.

FIG. 19 is a diagram illustrating a configuration example of an imaging device 30 according to the third embodiment.

In FIG. 19, the same elements as those in FIG. 2 are denoted by the same reference numerals. The differences from FIG. 2 will be described below.

As shown in FIG. 19, the imaging device 30 has an image storage device 31, an image processing unit 32, and a focusing unit 33.

The image storage device 31 stores image data output from the image sensor 12.

The image processing unit 32 has a function similar to the image processing unit 13 shown in FIG. 2, but differs therefrom in terms of generation of pattern data for development. More specifically, the image processing unit 32 has no pattern data for development stored in advance in any storage device.

The focusing unit 33 generates enlarged and reduced pattern data for development in order to focus the image data stored in the image storage device 31.

Figure 20:
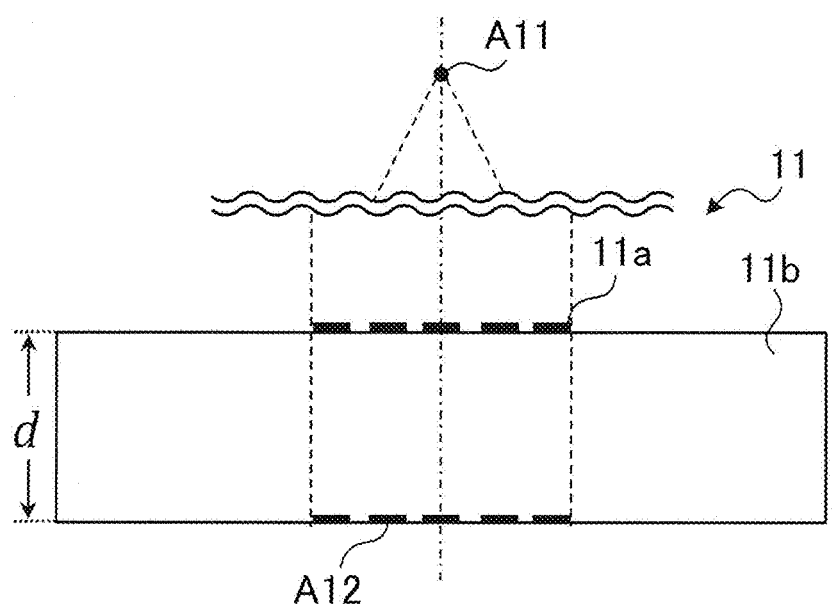
FIG. 20 is a diagram for explaining a projection onto an image sensor in the case of an object located at infinity.

FIG. 20 is a diagram for explaining a projection onto the image sensor 12 in the case of an object located at infinity. FIG. 20 shows therein a pattern 11a and a substrate 11b of a modulator 11. Further, the image sensor 12 is provided in close contact at the bottom of the substrate 11b, but the illustration of the image sensor 12 is omitted.

Spherical waves from a point A11 constituting the object at infinity turn into plane waves while sufficiently long-distance propagation. Light of the plane waves is adapted to irradiate the pattern 11a, and projected onto the image sensor 12.

In the case of an object located at infinity, a projection image A12 projected onto the image sensor 12 has almost the same shape as the pattern 11a. Therefore, a single bright spot can be obtained by carrying out cross-correlation operation with the projection image A12 and the pattern data for development.

Figure 21:
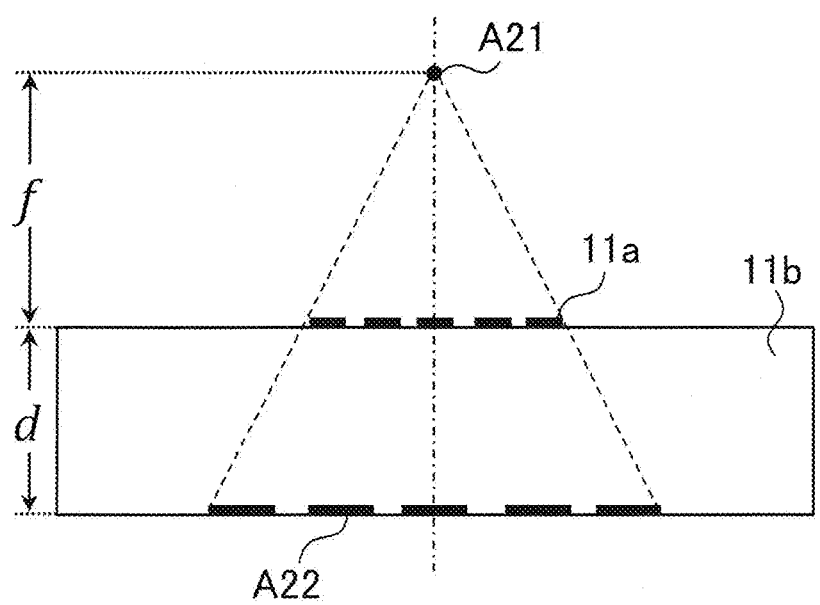
FIG. 21 is a diagram for explaining a projection onto an image sensor in the case of an object located at a finite distance.

FIG. 21 is a diagram for explaining a projection onto the image sensor 12 in the case of an object located at a finite distance. Light of spherical waves from a point A21 constituting the object is adapted to irradiate the pattern 11a, and projected onto the image sensor 12. In the case of an object of shooting located at a finite distance, a projection image A22 with the light of spherical waves from the point A21 is enlarged almost with uniformity.

The enlargement factor "α" of the projection image A22 is expressed by the following formula (13) with the distance "f" from the pattern 11a to the point A21.

[Mathematical Formula 13]

$$\alpha = \frac{f+d}{f} \quad (13)$$

The enlargement factor "α" of the projection image A22 varies depending on the distance "f". Therefore, cross-correlation operation directly with the use of a transmission distribution of pattern data for development, designed for parallel light, fails to obtain any single bright spot. As long as the pattern data for development is enlarged in accordance with a uniformly enlarged projection image (image data output from the image sensor 12), a single bright spot can be obtained for the enlarged projection image A22.

For example, the image processing unit 13 carries out a cross-correlation operation with the image data stored in the image storage device 31 and the pattern data for development, enlarged or reduced by the focusing unit 33, thereby making it possible to output a developed image with a single bright spot.

It is to be noted that the coefficient "β" of the pattern data for development, represented by the formula (6), may be adjusted to "β/α²", in order to obtain a single bright spot. More specifically, the focusing unit 33 adjusts the coefficient "β" of the formula (6) to "β/α²", and generates enlarged or reduced pattern data for development on the basis of the enlargement factor "α".

The focusing unit 33 may change the enlargement factor "α" in response to an operation from a user. For example, a user operates a GUI (Graphical User Interface) so as to focus an image while looking at the display of the mobile terminal 1, and the focusing unit 33 changes the enlargement factor "α" in response to the operation. The focusing unit 33 may automatically change the enlargement factor "α" so as to focus the image.

An operation example of the imaging device 30 will be described. An operation example will be described below in the case of using Fourier transform as the cross-correlation operation.

FIG. 22 is a flowchart showing an operation example of the imaging device 30. The imaging device 30 starts the processing in the flowchart shown in FIG. 22, for example, when a shutter button of the mobile terminal 1 is pressed by a user.

First, the image storage unit 31 stores image data shot by the image sensor 12 (step S21).

Next, the image processing unit 32 applies Fourier transform to the image data stored in the step S21 (step S22).

Next, the focusing unit 33 determines an enlargement factor (step S23). For example, the focusing unit 33 determines an enlargement factor in response to a user's operation or in an automatic manner.

Next, the image processing unit 32 generates pattern data for development in accordance with the enlargement factor determined in the step S23 (step S24).

Next, the image processing unit 32 applies Fourier transform to the pattern data for development, generated in the step S24 (step S25).

Next, the image processing unit 32 multiplies the image data subjected to the Fourier transform in the step S22 by the pattern data for development, subjected to the Fourier transform in the step S25 (step S26).

The processing from a step S27 to a step S31 is configured in the same fashion as the step S15 to the step S19 described with reference to FIG. 17, and the description thereof will be omitted.

As described above, the focusing unit 33 enlarges and reduces pattern data for development, which is subjected to cross-correlation operation with image data. Thus, the imaging device 30 can focus images.

In addition, the imaging device 30 causes the image storage device 31 to store therein image data output from the image sensor 12. Thus, the imaging device 30 can, after shooting, focus the shot images.

In addition, while conventional cameras require re-shooting in order to change the focuses, the imaging device 30 can, after shooting, focus the shot images (the image data stored in the image storage device 31), thus eliminating the need for re-shooting.

Fourth Embodiment

According to the second embodiment mentioned above, the explanation has been given while focusing on the signal component included in the formula (11), and in actuality, the inclusion of the noise terms other than the signal term "exp(−iku)" disturbs clear development. In a fourth embodiment, noise removal will be described.

Figure 23A:
FIGS. 23A AND 23B are a diagrams for explaining noises.
Figure 23B:

FIGS. 23A and 23B are diagrams for explaining noises. FIG. 23A shows an object of shooting. FIG. 23B shows an image in the case of shooting the object of shooting in FIG. 23A with the imaging device 10 according to the second embodiment.

As mentioned above, the formula (11) includes therein the terms other than the signal term "exp(−iku)". Therefore, when the object of shooting in FIG. 23A is shot with the imaging device 10 according to the second embodiment, the image data includes therein noises as shown in FIG. 23B.

Therefore, according to the fourth embodiment, noise cancellation based on fringe scan is carried out. The noise cancellation based on fringe scan will be described below.

As represented by the following formula (14), when the result of inter-grating multiplication is integrated with respect to the "ΦF" and the "ΦB" through the use of the orthogonality of a trigonometric function, the signal term multiplied by a constant is left with the noise terms cancelled.

[Mathematical Formula 14]

$$\int\int_0^{2\pi} \mathcal{F}[I_F(x)] \cdot \mathcal{F}[I_B(x)] \cdot \cos(\Phi_B - \Phi_F) d\Phi_B d\Phi_F = \frac{\pi}{4\beta} e^{-iku} \quad (14)$$

The application of inverse Fourier transform to the formula (14) provides a transform as represented by the following formula (15), thereby making it possible to obtain a bright spot without any noise in the location of "k" on the original x axis.

[Mathematical Formula 15]

$$\mathcal{F}^{-1}\left[\frac{\pi}{4\beta} e^{-iku}\right] = \frac{\pi^2}{2\beta} \delta(x+k) \quad (15)$$

In this regard, the formula (14) is shown in the form of an integral equation, but in actuality, a similar effect is achieved by calculating the sum in the combination of "ΦF" and "ΦB".

Figure 24:
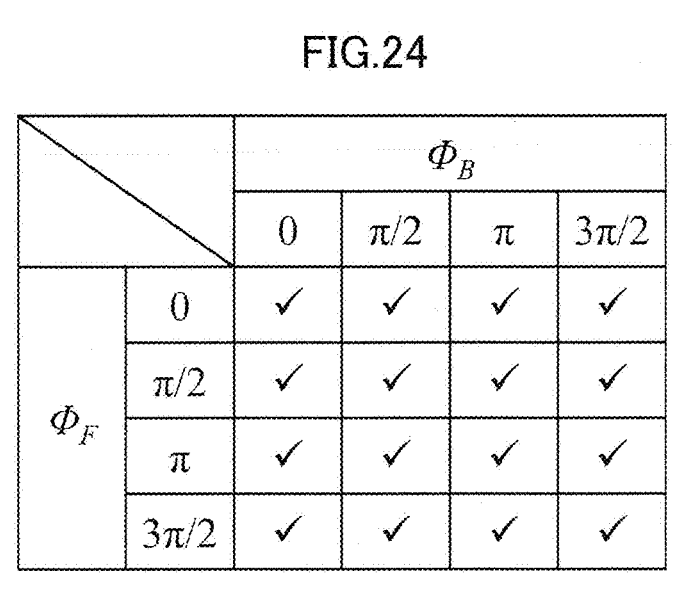

FIG. 24 is a diagram No. 1 showing examples of initial phase combinations in fringe scan. The "ΦF" in FIG. 24 represents an initial phase of a pattern formed at a modulator, and the "ΦB" therein represents an initial phase of pattern data for development.

As shown in FIG. 24, the "ΦF" and the "ΦB" are set so as to divide the angle of "0 to 2π" equally. The calculation of the sum in the combination of "ΦF" and "ΦB" shown in FIG. 24 achieves a similar effect to the formula (14).

It is to be noted that like the combination shown in FIG. 24, the "ΦF" and the "ΦB" may be set so as to divide the angle of "0 to 2π" equally, and divided equally into three, such as "0, π/3, 2π/3".

The formula (14) can be further simplified. For example, while calculations are made so that the "ΦF" and the "ΦB" are changed independently in accordance with FIG. 24, the noise terms can be cancelled even with "ΦF=ΦB", that is, when the same phase is applied to the initial phase of pattern of the modulator and the initial phase of the pattern data for development. For example, the following formula (16) is obtained with "ΦF=ΦB=Φ" substituted in the formula (14)

[Mathematical Formula 16]

$$\int_0^{2\pi} \mathcal{F}[I_F(x)] \cdot \mathcal{F}[I_B(x)] d\Phi = \frac{1}{4\beta} e^{-iku} \quad (16)$$

As represented by the formula (16), even in the case of "ΦF=ΦB=Φ", signal light multiplied by a constant will be left with the noise terms cancelled.

The application of inverse Fourier transform to the formula (16) provides a transform as represented by the following formula (17), thereby making it possible to obtain a bright spot without any noise in the location of "k" on the original x axis.

[Mathematical Formula 17]

$$\mathcal{F}^{-1}\left[\frac{1}{4\beta} e^{-iku}\right] = \frac{\pi}{2\beta} \delta(x+k) \quad (17)$$

Figure 25:
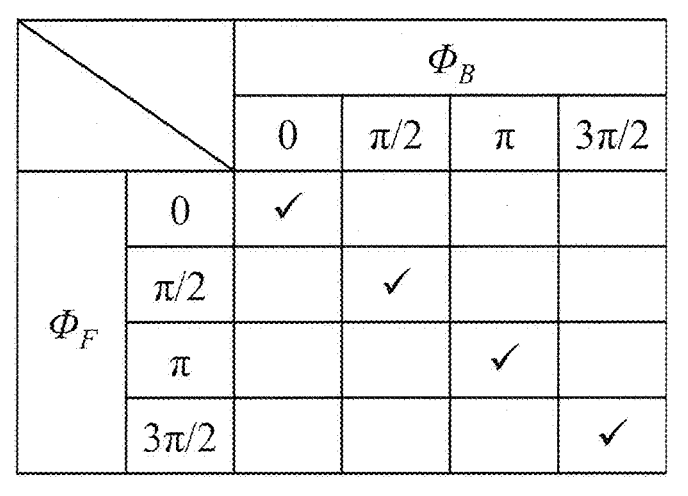

FIG. 25 is a diagram No. 2 showing examples of initial phase combinations in fringe scan. The calculation of the sum in the combination (ΦF=ΦB=Φ) of "ΦF" and "ΦB" shown in FIG. 25 achieves a similar effect to the formula (16).

It is to be noted that like the combination shown in FIG. 25, the "ΦF" and the "ΦB" may be set so as to divide the angle of "0 to 2π" equally, and divided equally into three, such as "0, π/3, 2π/3".

In addition, when the combination of "ΦF" and "ΦB" is "0, π/2", the formula (14) can be further simplified. In this case, the formula (16) is adapted as represented by the following formula (18).

[Mathematical Formula 18]

$$\mathcal{F}[I_F(x)|_{\Phi=0}] \cdot \mathcal{F}[I_B(x)|_{\Phi=0}] + \mathcal{F}[I_F(x)|_{\Phi=\pi/2}] \cdot \mathcal{F}[I_B(x)|_{\Phi=\pi/2}] = \quad (18)$$

$$\frac{e^{-iku}}{8\pi\beta} \cdot \left[\sin\left(\frac{u^2}{4\beta} + \frac{\pi}{4}\right)\right]^2 + \frac{e^{-iku}}{8\pi\beta} \cdot \left[\sin\left(\frac{u^2}{4\beta} - \frac{\pi}{4}\right)\right]^2 = \frac{e^{-iku}}{8\pi\beta}$$

As represented by the formula (18), even when the combination of "ΦF" and "ΦB" is "0, π/2", signal light multiplied by a constant will be left with the noise terms cancelled.

The application of inverse Fourier transform to the formula (18) provides a transform as represented by the following formula (19), thereby making it possible to obtain a bright spot without any noise in the location of "k" on the original x axis.

[Mathematical Formula 19]

$$\mathcal{F}^{-1}\left[\frac{1}{8\pi\beta} e^{-iku}\right] = \frac{1}{4\beta} \delta(x+k) \quad (19)$$

Figure 26:
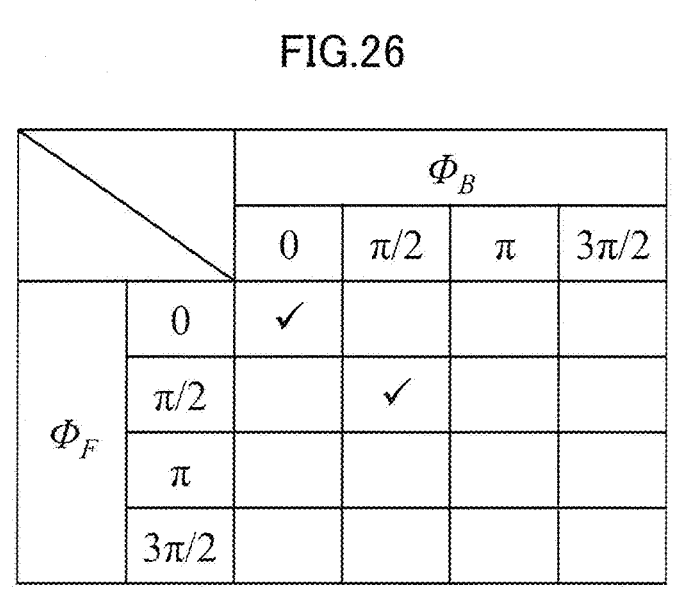

FIG. 26 is a diagram No. 3 showing examples of initial phase combinations in fringe scan. The calculation of the sum in the combination (ΦF=ΦB=Φ=0, π/2) of "ΦF" and "ΦB" shown in FIG. 26 achieves a similar effect to the formula (18).

It is to be noted that there is a need for the two phases "Φ" to be selected so as to be orthogonal to each other (Phase Difference=π/2+nπ: n is an integer).

In accordance with the formula (14), there is a need to multiply "cos(ΦB−ΦF)", and in accordance with the formula (16) and the formula (18), there is a need to synchronize the phases of two grating patterns. More specifically, in accordance with the calculation methods described above, there is a need to identify the initial phases of the pattern formed at the modulator and of the pattern data for development. In order to allow an operation without identifying the initial phases, the square of the result of inter-grating multiplication may be integrated as in the following formula (20).

[Mathematical Formula 20]

$$\int\int_0^{2\pi} \{\mathcal{F}[I_F(x)] \cdot \mathcal{F}[I_B(x)]\}^2 d\Phi_B d\Phi_F = \frac{\pi}{16\beta^2}e^{-2iku} + \frac{\pi}{2\beta}[\delta(u)]^2 \quad (20)$$

The "ΦB" and the "ΦF" are not included in the formula (20). More specifically, the calculation in accordance with the formula (20) can achieve noise cancellation even when the initial phases are not known.

The application of inverse Fourier transform to the formula (20) provides a transform as represented by the following formula (21), thereby making it possible to obtain a bright spot without any noise in the location of "k" on the original x axis.

[Mathematical Formula 21]

$$\mathcal{F}^{-1}\left[\frac{\pi}{16\beta^2}e^{-2iku} + \frac{\pi}{2\beta}\delta(u)\right] = \frac{\pi^2}{8\beta^3}\delta(x+2k) + \frac{\pi}{2\beta} \quad (21)$$

The "π/2β" represented in the formula (21) indicates an offset of luminance by "π/2β" with respect to a bright spot, which is not any substantial noise.

Figure 27:
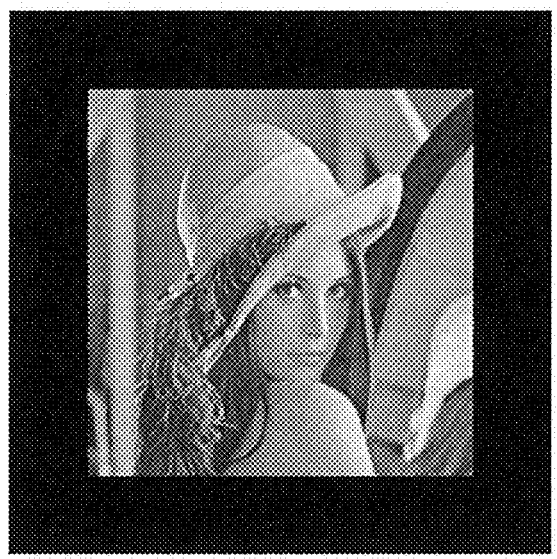
FIG. 27 shows an example of image data with noises cancelled.

FIG. 27 shows an example of image data with noises cancelled. The development processing with the use of the formula (14) to the formula (21) cancels noises of the image data shown in FIG. 23B as shown in FIG. 27. More specifically, according to the fringe scan described with reference to the formula (14) to the formula (21), the object of shooting can be developed properly as shown in FIG. 27.

The configuration of an imaging device for carrying out the noise cancellation mentioned above will be described. In accordance with the fringe scan, the modulator is required to have multiple patterns that differ in initial phase. In order to achieve the multiple patterns that differ in initial phase, the pattern at the modulator is switched in a time-division manner.

Figure 28:
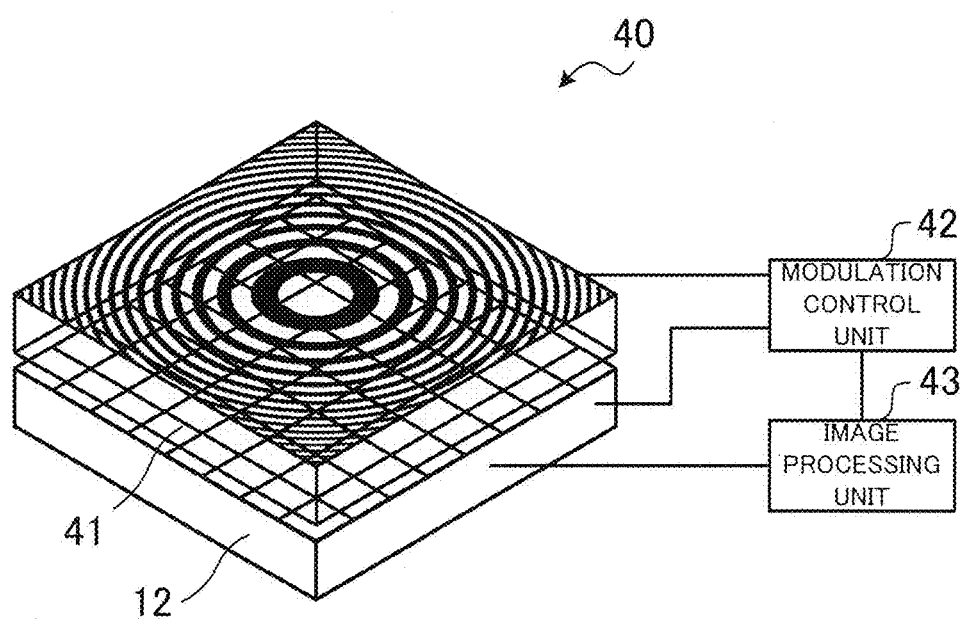
FIG. 28 is a diagram illustrating a configuration example of an imaging device according to a fourth embodiment.

FIG. 28 is a diagram illustrating a configuration example of an imaging device according to the fourth embodiment. In FIG. 28, the same elements as those in FIG. 2 are denoted by the same reference numerals. As shown in FIG. 28, an imaging device 40 has a modulator 41, a modulation control unit 42, and an image processing unit 43.

The modulator 41 switches and displays multiple patterns that differ in initial phase. For example, the modulator 41 has a liquid crystal display element, which switches and displays multiple patterns that electrically differ in initial phase.

Figure 29A:
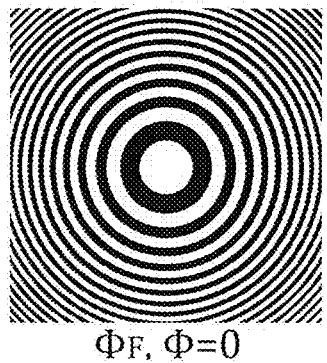
FIG. 29A to 29D are diagrams illustrating examples of multiple initial phases displayed by a modulator.
Figure 29B:
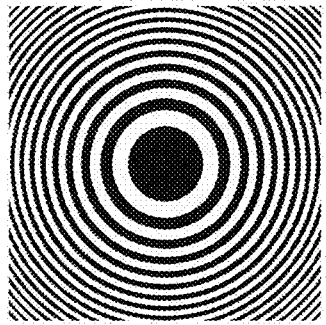
Figure 29C:
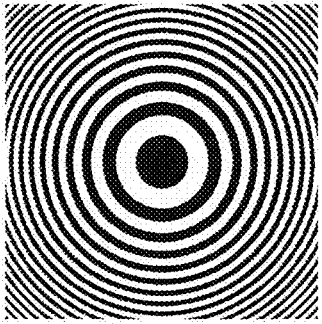
Figure 29D:
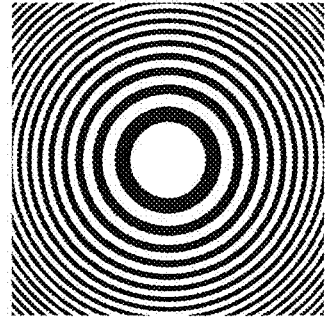

FIGS. 29A to 29D are diagrams illustrating examples of multiple initial phases displayed by the modulator 41. FIG. 29A shows a pattern example displayed by the modulator 41, where the initial phase "ΦF" or "Φ" is "0". FIG. 29B shows a pattern example displayed by the modulator 41, where the initial phase "ΦF" or "Φ" is "π/2". FIG. 29C shows a pattern example displayed by the modulator 41, where the initial phase "ΦF" or "Φ" is "π". FIG. 29D shows a pattern example displayed by the modulator 41, where the initial phase "ΦF" or "Φ" is "3π/2".

Return to the explanation of FIG. 28. The modulation control unit 42 controls the timing of switching the pattern at the modulator 41 and the shutter timing of the image sensor 12 in synchronization. For example, the modulation control unit 42 sequentially switches the pattern at the modulator 41 in accordance with the four patterns shown in FIGS. 29A to 29D, and at the same time, controls the image sensor 12 so as to shoot a subject. More specifically, the image sensor 12 shoots the subject four times in order to obtain a one-frame image (shooting twice in the case of FIG. 26).

The modulation control unit 42 transmits, in switching the pattern at the modulator 41, information on the initial phase of the pattern switching, to the image processing unit 43. For example, in the case of switching the pattern at the modulator 41 from the pattern shown in FIG. 29A to the pattern shown in FIG. 29B, the modulation control unit 42 transmits information on the initial phase "π/2" to the image processing unit 43.

The image processing unit 43 changes the initial phase of pattern data for development on the basis of the initial phase transmitted from the modulation control unit 42. Then, the image processing unit 43 calculates the sum in the combination of "ΦF" and "ΦB" (calculates the sum in the combination of "ΦF=ΦB=Φ" in the case of the example in FIG. 25 or FIG. 26).

For example, to explain with the use of the example in FIG. 24, the image processing unit 43 sequentially switches, when the initial phase "ΦF=0" is transmitted from the modulation control unit 42, the initial phase "ΦB" of the pattern data for development to "0, π/2, π, 3π/2". In addition, the image processing unit 43 sequentially switches, when the initial phase "ΦF=π/2" is transmitted from the modulation control unit 42, the initial phase "ΦB" of the pattern data for development to "0, π/2, π, 3π/2". Likewise, the image processing unit 43 switches the initial phase of the pattern data for development in the same way, thereby figuring out the sum of multiplication results in all of the combinations shown in FIG. 24.

An operation example of the imaging device 40 will be described. An operation example will be described below in the case of using Fourier transform as the cross-correlation operation.

Figure 30:
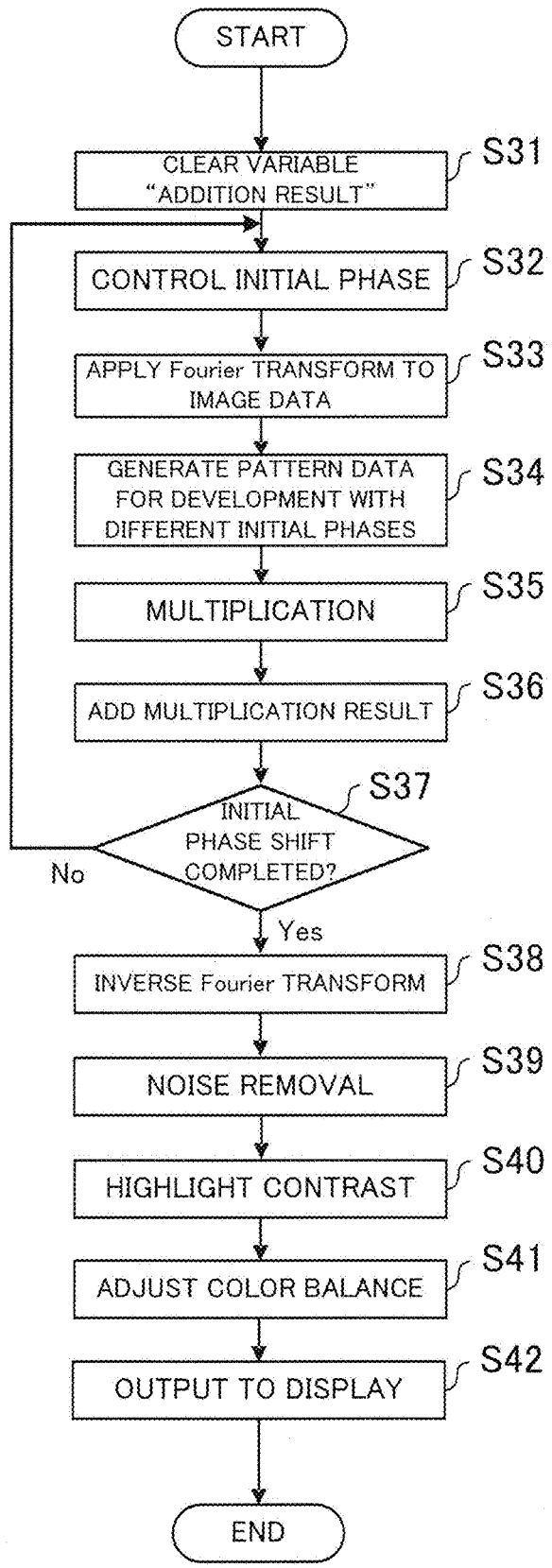
FIG. 30 is a flowchart showing an operation example of the imaging device.

FIG. 30 is a flowchart showing an operation example of the imaging device 40. The imaging device 40 starts the processing in the flowchart shown in FIG. 30, for example, when a shutter button of the mobile terminal 1 is pressed by a user.

First, the image processing unit 43 clears a variable "addition result" (step S31).

Next, the modulation control unit 42 controls the initial phase of a pattern at the modulator 41 (step S32). For example, the modulation control unit 42 sequentially switches the pattern at the modulator 41 as shown in FIGS. 29A to 29D, every time the processing makes a transition from a step S37 to the step 32 in question. Further, the modulation control unit 42 transmits information on the pattern at the modulator 41 to the image processing unit 43.

Next, the image processing unit 43 applies Fourier transform to image data output from the image sensor 12 (step S33).

Next, the image processing unit 43 generates pattern data for development with different initial phases (step S34) For example, in the case of the example in FIG. 24, the modulation control unit 42 generates four types of pattern data for development "0, π/2, π, 3π/2", with respect to the initial phase "ΦF=0".

It is to be noted that the initial phase "ΦF" is switched, for example, from "ΦF=0", to "π/2, π, 3π/2" on each loop from the step 37. The image processing unit 43 will generate four types of pattern data for development with initial phases "0, π/2, π, 3π/2", with respect to each initial phase "ΦF=π/2, π, 3π/2".

Next, the image processing unit 43 multiplies the image data subjected to the Fourier transform in the step S33 by the pattern data for development, generated in the step S34 (step S35). It is to be noted that four multiplication results are obtained, because there are the four types of pattern data for development.

Next, the image processing unit 43 adds the multiplication results calculated in the step S35, to the addition result stored in the variable "addition result" (step S36).

Next, the modulation control unit 42 determines whether the initial-phase switching (initial-phase shift) has been all completed or not (step S37). For example, the modulation control unit 42 determines whether the patterns at the modulator 41 as shown in FIGS. 29A to 29D have been all switched or not.

When the modulation control unit 42 determines in the step S37 that the initial-phase switching has not all been completed ("No" in S37), the modulation control unit 42 causes the processing to make a transition to the step S32. On the other hand, when the modulation control unit 42 determines in the step S37 that the initial-phase switching has all been completed ("Yes" in S37), the modulation control unit 42 causes the processing to make a transition to a step S38.

The image processing unit 43 applies inverse Fourier transform to the multiplication results obtained in the step S36 (the multiplication results stored in the variable "addition result") (step S38).

The processing from a step S39 to a step S42 is configured in the same fashion as the step S16 to the step S19 described with reference to FIG. 17, and the description thereof will be omitted.

As described above, the modulation control unit 42 switches, in a time-division manner, multiple patterns that differ in initial phase at the modulator 41. Further, the image processing unit 43 changes the initial phase of pattern data for development in response to the initial phase switching at the modulator 41. Thus, the imaging device 40 can cancel noises of images obtained from the image sensor 12 through the simple operation.

Fifth Embodiment

According to the fourth embodiment mentioned above, patterns that differ in initial phase at the modulator 41 are switched in a time-division manner. According to a fifth embodiment, patterns that differ in initial phase at a modulator are spatially divided.

Figure 31:
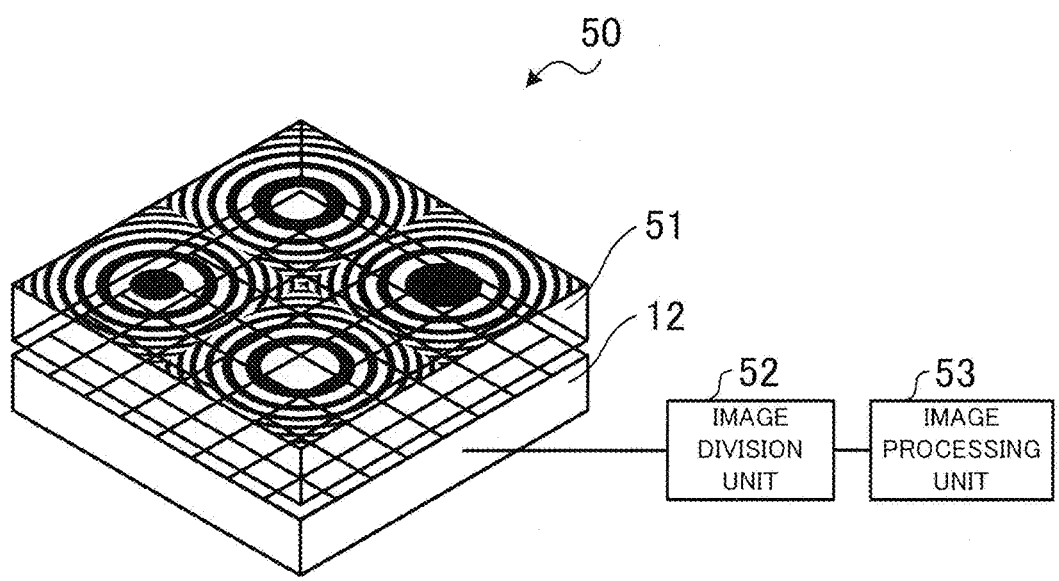
FIG. 31 is a diagram illustrating a configuration example of an imaging device according to a fifth embodiment.

FIG. 31 is a diagram illustrating a configuration example of an imaging device according to the fifth embodiment. In FIG. 31, the same elements as those in FIG. 2 are denoted by the same reference numerals. As shown in FIG. 31, the imaging device 50 has a modulator 51, an image division unit 52, and an image processing unit 53.

The modulator 51 has multiple patterns.

Figure 32:
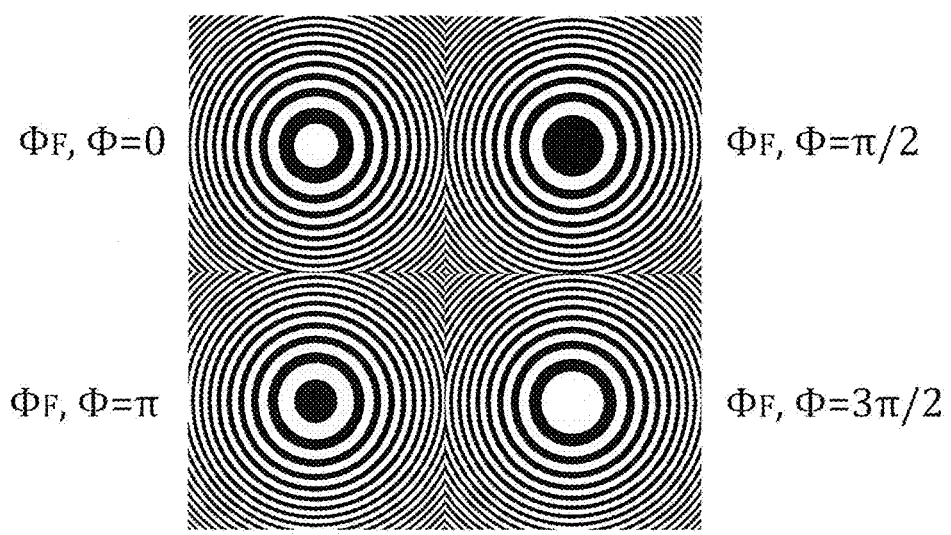
FIG. 32 shows a pattern example formed at a modulator.

FIG. 32 shows a pattern example formed at the modulator 51. At the modulator 51, for example, as shown in FIG. 32, multiple patterns are two-dimensionally formed. In the example of FIG. 32, the multiple patterns each have an initial phase "ΦF" or "Φ" of "0, π/2, π, 3π/2".

It is to be noted that the multiple patterns of 2×2 are formed at the modulator 51 in the example of FIG. 32. The fringe scan on the basis of the formula (18) can be achieved with two phases (see FIG. 26), and thus, in this case, multiple patterns of 1×2 are formed at the modulator 51.

Return to the explanation of FIG. 31. The image division unit 52 divides image data output from the image sensor 12 into regions in accordance with the pattern layout of the modulator 51, and sequentially outputs the divided image data to the image processing unit 53. In the case of the pattern layout of the modulator 51 according to the example in FIG. 32, the image division unit 52 divides the image data into 2×2, and sequentially outputs the divided image data to the image processing unit 53.

The image processing unit 53 has pattern data for development with initial phases corresponding to the multiple patterns at the modulator 51, for example, stored in advance in a storage device. For example, in the case of the example in FIG. 32, the image processing unit 53 has four types of pattern data for development. The image processing unit 53 obtains, for the image data output from the image division unit 52, a developed image with the use of the corresponding pattern data for development. For example, the image processing unit 53 obtains a developed image by cross-correlation operation with the divided image data output from the image division unit 52 and the pattern data for development, corresponding to the divided image data.

As described above, the modulator 51 has multiple patterns that differ in initial phase. Further, the image processing unit 53 has pattern data for development with difference initial phases corresponding to the multiple patterns. Thus, the imaging device 50 can cancel noises of images obtained from the image sensor 12 through the simple operation.

In addition, the modulator 51, which has multiple patterns spatially divided, can be thus prepared inexpensively, without electrically switching any pattern. However, the imaging device 50 has a resolution substantially decreased, because the image data is divided. Accordingly, the time-division system described in the fourth embodiment is suitable when there is a need to increase the resolution.

It is to be noted that the image processing unit 53 is supposed to have pattern data for development stored in the storage device according to the foregoing, but may generate the data.

Sixth Embodiment

According to a sixth embodiment, a pattern is used which is not limited to Fresnel Zone Plate or Gabor Zone Plate. An imaging device according to the sixth embodiment has the same configuration as the imaging device 10 shown in FIG. 2, but partially differs therefrom in the functions of the modulator 11 and image processing unit 13. The differences from the first embodiment will be described below.

First, generalize formulas. The formula (5) is a mathematical formula that represents a projection image of Gabor Zone Plate, and the generalized formula (5) can be expressed by the following formula (22).

[Mathematical Formula 22]

$$I_F(x) = 1 + f(x+k, \Phi_F) \quad (22)$$

The "f" desirably refers to a function that has an average value of 0 and an amplitude from −1 to +1. Likewise, the generalized pattern data for development (formula (6)) can be expressed by the following formula (23).

[Mathematical Formula 23]

$$I_B(x)f=(x,\Phi_B) \tag{23}$$

The Fourier transform of the formula (22) and formula (23) respectively provide results as represented by the following formula (24) and formula (25).

[Mathematical Formula 24]

$$\mathcal{F}[I_F(x)]=\delta(u)+e^{-iku}F(u,\Phi_F) \tag{24}$$

[Mathematical Formula 25]

$$\mathcal{F}[I_B(x)]=F(u,\Phi_B) \tag{25}$$

In this regard, F[ ], F( ), u, and δ respectively represent a Fourier transform operation, a Fourier transform of the function f, a frequency coordinate in the x direction, and a delta function.

Next, while the multiplication can be carried out as in the case of the formula (11) because the formulas subjected to the Fourier transform also correspond to Gabor Zone Plate with real numbers according to the second embodiment described above, complex conjugate multiplication is carried out in the case of generalization. Therefore, the multiplication of the formula (24) by the formula (25) provides a result as represented by the following formula (26).

[Mathematical Formula 26]

$$\mathcal{F}[I_F(x)]\cdot\{\mathcal{F}[I_B(x)]\}^* = \delta(u)F^*(u,\Phi_B)+e^{-iku}F(u,\Phi_F)F^*(u,\Phi_B) \tag{26}$$
$$= \delta(u)F^*(0,\Phi_B)+e^{-iku}F(u,\Phi_F)F^*(u,\Phi_B)$$

In this regard, the symbol "*" represents a complex conjugate. The term "exp(−iku)" represented by an exponential function in the formula (26) refers to a signal component.

The following formula (27) is obtained by substation of "ΦF=ΦB=Φ" as is the case with the fringe scan described in the fourth embodiment.

[Mathematical Formula 27]

$$\mathcal{F}[I_F(x)]\cdot\{\mathcal{F}[I_B(x)]\}^*=\delta(u)F^*(0,\Phi)+e^{-iku}|F(u,\Phi)|^2 \tag{27}$$

The formula (27) includes a δ function, which is not any substantial noise because the function is transformed to a constant by inverse Fourier transform. Accordingly, when the terms excluding the foregoing is subjected to inverse Fourier transform, the following formula (28) is obtained.

[Mathematical Formula 28]

$$\mathcal{F}^{-1}[e^{-iku}|F(u,\Phi)|^2]=2\pi\delta(x+k)*\mathcal{F}^{-1}[|F(u,\Phi)|^2] \tag{28}$$

In this regard, the symbol "*" represents a convolution operation. Therefore, in order for the formula (28) to provide a single bright spot (δ function), it is desirable to use, as a pattern, the function f where the power spectrum "|F(u,Φ)|²" is close to a constant over the whole range of the frequency "u".

Examples of the function f where the power spectrum provides a constant include, for example, random numbers. The use of random patterns as a pattern at the modulator 11 and pattern data for development in the image processing unit 13 allows shooting with reduced influences of noise terms. In addition, from the formula (28), it is determined that the resolution of a developed image is determined by the response to Fourier transform of the power spectrum from the function f. The Fourier transform of the power spectrum refers to an autocorrelation function, and in short, the autocorrelation function for a pattern is a PSF (Point Spread Function) for a developed image, which determines the resolution.

FIGS. 33A to 33D are diagrams illustrating examples of Fresnel Zone Plate. FIGS. 33A to 33D show parts of Fresnel Zone Plates (for example, an upper left part of the Fresnel Zone Plate shown in FIG. 6).

In FIGS. 33A to 33D, as an index of pattern fineness, "Z4" of "β" normalized with the sensor size is defined as represented by the following formula (29).

[Mathematical Formula 29]

$$Z_4 = \frac{\beta S^2}{4\pi} \tag{29}$$

FIGS. 33A, 33B, 33C, and 33D respectively show Fresnel Zone Plate examples with "Z4=512", "Z4=256", "Z4=128", and "Z4=64". It is to be noted that one pixel of the pattern is regarded as a pixel size of an image sensor.

Figure 33A:
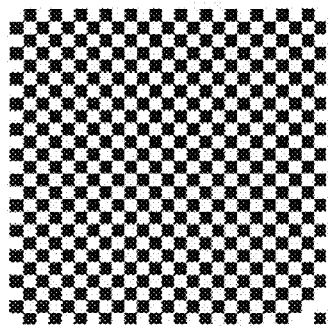
FIGS. 33A to 33D are diagrams illustrating examples of Fresnel Zone Plate.
Figure 33B:
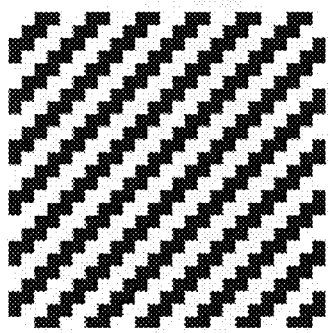
Figure 33C:
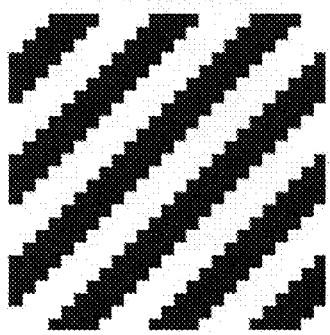
Figure 33D:
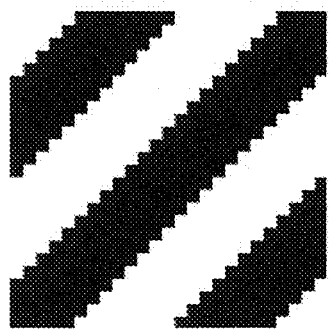
Figure 34:
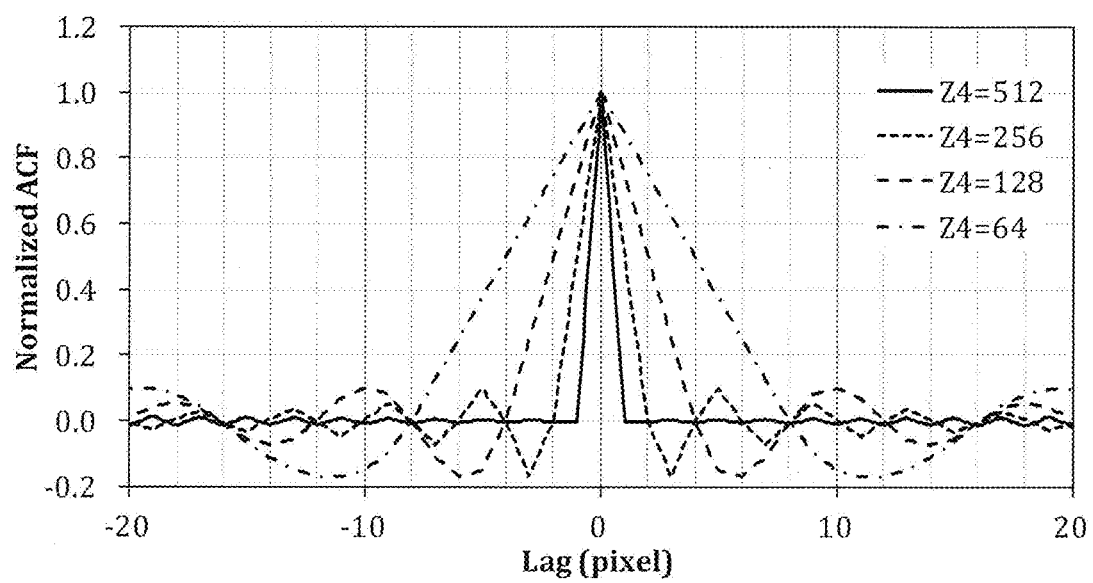
FIG. 34 is a diagram showing autocorrelation functions for the Fresnel Zone Plates in FIGS. 33A to 33D.

FIG. 34 is a diagram showing autocorrelation functions for the Fresnel Zone Plates in FIGS. 33A to 33D. The horizontal axis in FIG. 34 indicates Lag, whereas the vertical axis therein indicates ACF (Autocorrelation Function).

The graph of "Z4=512" shown in FIG. 34 shows the autocorrelation function for the pattern in FIG. 33A. The graph of "Z4=256" shown in FIG. 34 shows the autocorrelation function for the pattern in FIG. 33B. The graph of "Z4=128" shown in FIG. 34 shows the autocorrelation function for the pattern in FIG. 33C. The graph of "Z4=64" shown in FIG. 34 shows the autocorrelation function for the pattern in FIG. 33D.

As shown in FIG. 34, it is determined that as the pattern pitch is finer (as Z4 has a larger value), the ACF main lobe has a reduced half width, with an improvement in resolution.

FIGS. 35A to 35D are diagrams illustrating random pattern examples according to the sixth embodiment. FIGS. 35A to 35D show parts of the random patterns. FIGS. 35A, 35B, 35C, and 35D respectively show random pattern examples with the minimum pattern widths of "one pixel", "two pixels", "four pixels", and "eight pixels".

Figure 35A:
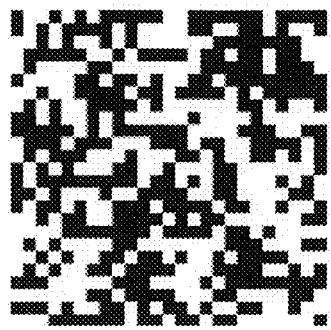
FIGS. 35A to 35D are diagrams illustrating random pattern examples according to a sixth embodiment.
Figure 35B:
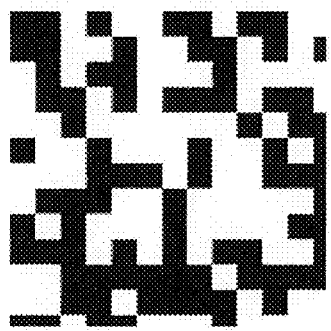
Figure 35C:
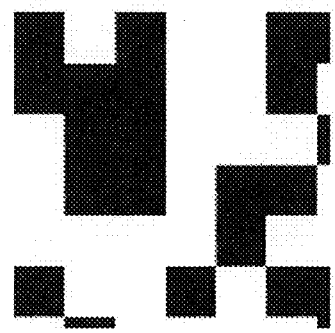
Figure 35D:
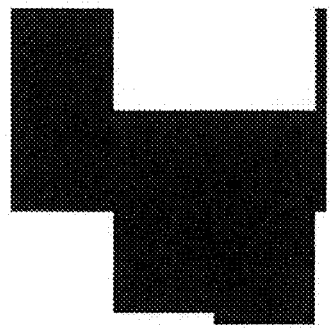
Figure 36:
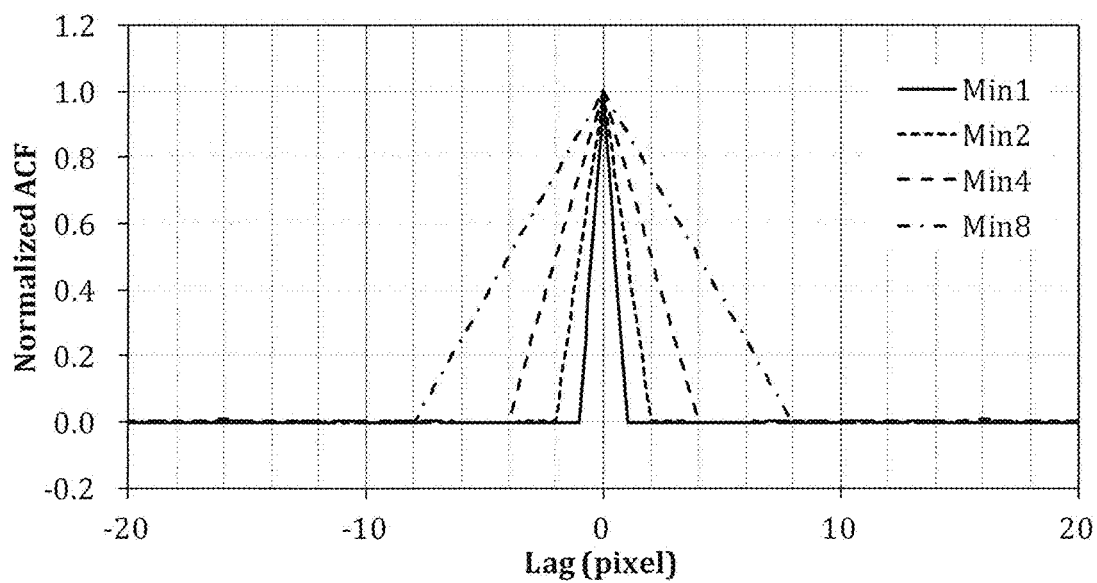
FIG. 36 is a diagram showing autocorrelation functions for the random patterns in FIGS. 35A to 35D.

FIG. 36 is a diagram showing autocorrelation functions for the random patterns in FIGS. 35A to 35D. The horizontal axis in FIG. 36 indicates Lag, whereas the vertical axis therein indicates ACF.

The graph of "Min=1" shown in FIG. 36 shows the autocorrelation function for the random pattern in FIG. 35A. The graph of "Min=2" shown in FIG. 36 shows the autocorrelation function for the pattern in FIG. 35B. The graph of "Min=4" shown in FIG. 36 shows the autocorrelation function for the pattern in FIG. 35C. The graph of "Min=8" shown in FIG. 36 shows the autocorrelation function for the pattern in FIG. 35D.

As shown in FIG. 36, it is determined that the random patterns have peripheral noises suppressed more than the Fresnel Zone Plates.

As described above, random patterns are applied to the pattern formed at the modulator 11 and the pattern of the pattern data for development in the image processing unit 13. This application can also suppress noises of developed images.

In addition, when the autocorrelation function for the random pattern has a single peak, noises of developed images can be further suppressed.

In addition, the imaging device 10 can improve the degree of freedom for design through the use of any pattern other than Fresnel Zone Plate.

Further, any pattern can be used besides the random patterns. For example, as in FIG. 34 or 36, any pattern can be used besides the random patterns, as long as the autocorrelation function for the pattern has a single main lobe, and has a side lobe located around the main lobe at least not to exceed the main lobe. In addition, as in FIGS. 34 and 36, a function is preferred where the peak of a side lobe monotonically decreases with distance from a main lobe. For example, a speckle pattern generated when a scatterer is irradiated with coherent light can be also used as a pattern.

In addition, while the explanation has been given above to select the function f where the power spectrum "$|F(u,\Phi)|^2$" of the formula (27) is close to a constant over the whole range of the frequency "u", it is determined that the noise component is cancelled when the result of the formula (27) is divided by the power spectrum "$|F(u,\Phi)|^2$". However, if the power spectrum includes "0", the division by "0" is caused, and thus, in this case, there is a need to select a pattern where the power spectrum has no "0".

In addition, the development of the formula (22) to formula (28) is not limited to the function f with real numbers, but also satisfied by complex functions. More specifically, it is even practicable to adopt a pattern with not only transmission modulation but also phase modulation added.

In addition, if the pattern formed at the modulator is not disclosed, but kept confidential, the output of the image sensor will be optically encrypted. For this development processing, it is necessary to know the pattern for shooting, thus making it possible to improve the security. In order to further enhance the confidentiality due to the foregoing encryption effect, when the pattern for shooting is electrically switched to allow for display, and shared with a photographer and a developer, the confidentiality is further improved without worrying that the pattern is analyzed.

Seventh Embodiment

According to a seventh embodiment, the influence of diffraction of light passing through a modulator is reduced. An imaging device according to the seventh embodiment has the same configuration as the imaging device 10 shown in FIG. 2, but partially differs therefrom in the function of the image processing unit 13. The difference from the first embodiment will be described below.

Fresnel Zone Plate is narrower outward in pattern pitch "p(r)", and more influenced by diffraction. Under this influence, projection images passing through the modulator 11 will be blurred, and projected onto the image sensor. When this blurred image data is developed, for example, by the method described in the first embodiment, the correlation function will be spread, thereby decreasing the resolution.

Figure 37:
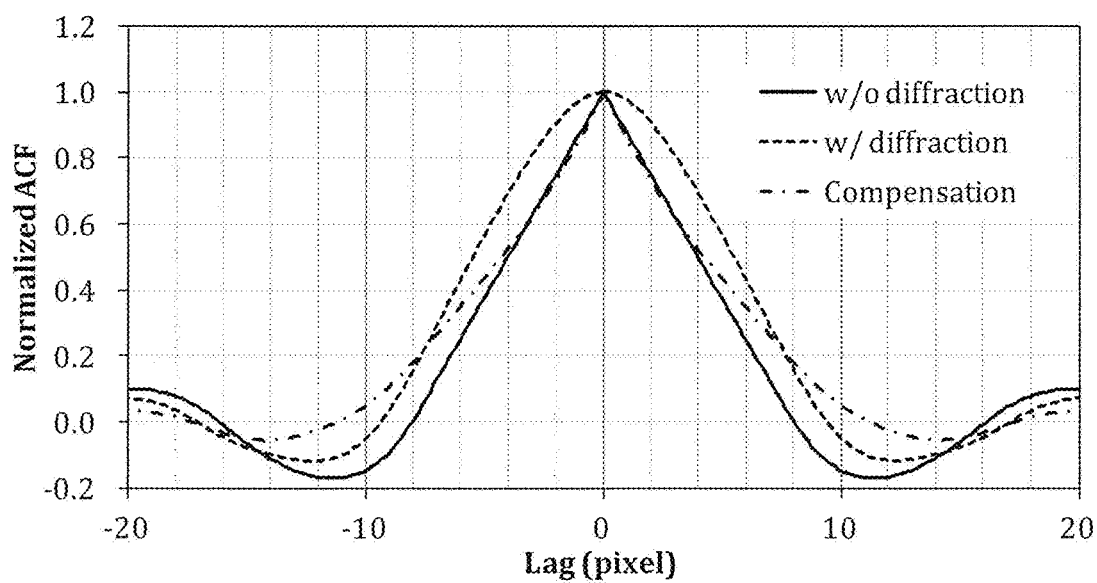
FIG. 37 is a diagram for explaining the spread of a correlation function.

FIG. 37 is a diagram for explaining the spread of the correlation function. The horizontal axis in FIG. 37 indicates Lag, whereas the vertical axis therein indicates ACF. The graph indicated by a dotted line in FIG. 37 shows the result of a correlation function in the case of "Z4=64" in FIG. 33D.

In this regard, the pitch widened by diffraction is expressed by the following formula (30).

[Mathematical Formula 30]

$$p'(r) \sim \frac{d\lambda}{np(r)} \quad (30)$$

"d" represents, for example, the thickness of the substrate 11b shown in FIG. 3, "n" represents the refractive index of the substrate 11b, and "λ" represents an incident light wavelength. It is possible to estimate in advance the quantity of the foregoing diffraction on the basis of parameters such as "d, n, λ". Accordingly, the image processing unit 13 can compensate for the influence of the diffraction, as long as the image processing unit 13 generates pattern data for development in consideration of the diffraction. For example, the image processing unit 13 estimates a diffraction image obtained when a pattern provided at the modulator 11 is projected onto the image sensor 12, on the basis of the thickness of the modulator 11, the refractive index of the modulator 11, and a wavelength intended for shooting, and generates pattern data for development from the estimated diffraction image.

A long dashed short dashed line in FIG. 37 indicates a correlation function for pattern data for development in consideration of the diffraction. As indicated by the long dashed short dashed line in FIG. 37, it is determined that the resolution is improved.

An operation example of the imaging device 10 will be described. An operation example will be described below in the case of using Fourier transform as the cross-correlation operation.

Figure 38:
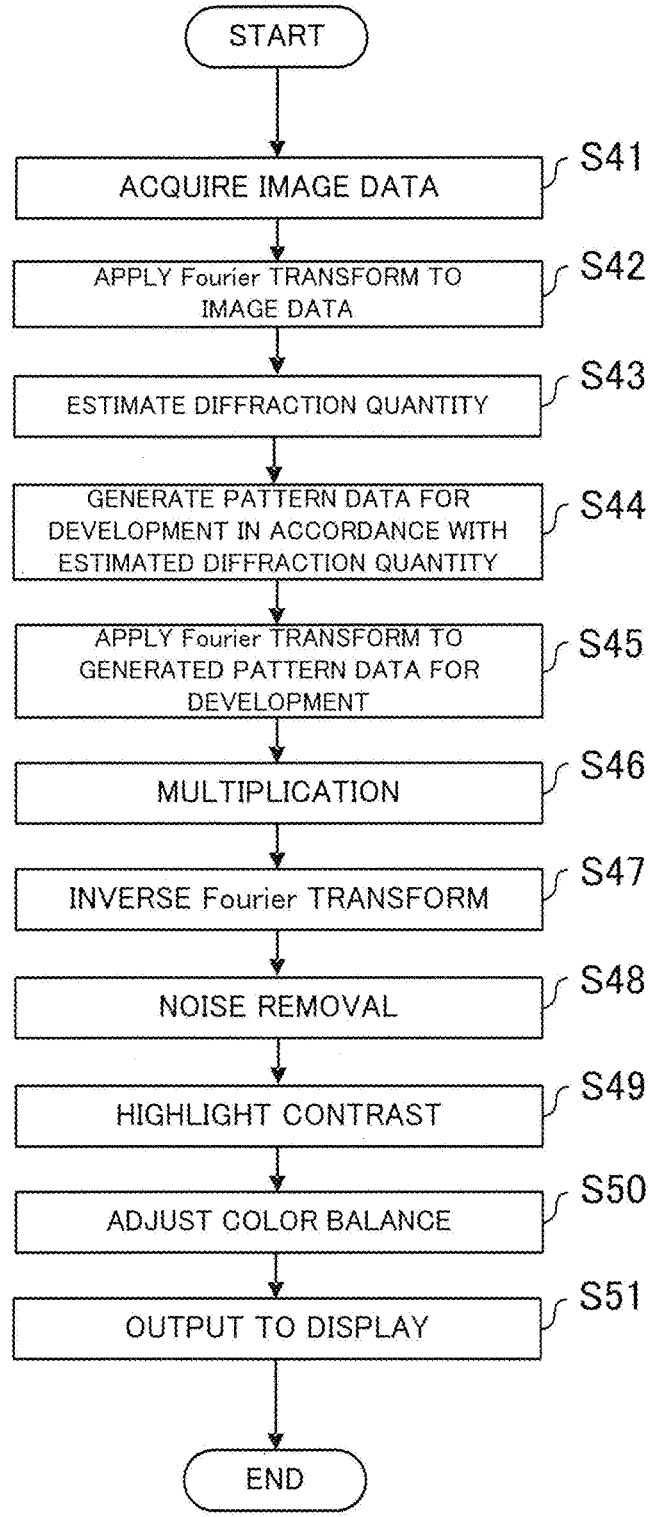
FIG. 38 is a flowchart showing an operation example of an imaging device according to a seventh embodiment.

FIG. 38 is a flowchart showing an operation example of the imaging device 10 according to the seventh embodiment. The imaging device 10 starts the processing in the flowchart shown in FIG. 38, for example, when a shutter button of the mobile terminal 1 is pressed by a user.

First, the image processing unit 13 acquires image data shot by the image sensor 12 (step S41).

Next, the image processing unit 13 applies Fourier transform to the image data acquired in the step S41 (step S42).

Next, the image processing unit 13 estimates the diffraction quantity of a projection image projected onto the image sensor 12 (step S43). For example, the image processing unit 13 estimates the diffraction quantity on the basis of the thickness of the modulator 11, the refractive index of the modulator 11, and a wavelength intended for shooting.

Next, the image processing unit 13 generates pattern data for development on the basis of the diffraction quantity estimated in the step S43 (step S44). More specifically, the image processing unit 13 generates pattern data for development for compensating for the diffraction of the projection image projected on to the image sensor 12.

Next, the image processing unit 13 applies Fourier transform to the pattern data for development, generated in the step S44 (step S45).

The processing from a step S46 to a step S51 is configured in the same fashion as the step S14 to the step S19 described with reference to FIG. 17, and the description thereof will be omitted.

While the image processing unit 13 is supposed to generate pattern data for development according to the foregoing description, pattern data for development may be generated in advance, subjected to Fourier transform, and then stored in a storage device. In this case, the need for the processing from the steps S43 to S45 in FIG. 38 is eliminated. Then, the image processing unit 13 may read out the pattern data for development, subjected to the Fourier transform, and stored in the storage device.

As described above, the pattern data for development is created from an estimated diffraction image by estimating the diffraction image obtained when the pattern 11a provided at the modulator 11 is projected onto the image sensor 12, on the basis of the thickness of the modulator 11, the refractive index of the modulator 11, and a wavelength intended for shooting. Thus, the imaging device 10 can prevent image quality from being degraded by diffraction.

It is to be noted that while the formula (30) has been described above as an example for the calculation of the diffraction pattern, it is possible to use a diffraction image calculation from the Fresnel diffraction equation, a wavefront estimation by a plane wave expansion method, an electromagnetic wave analysis by a FDTD (Finite-difference Time-Domain) method, or the like for more strict calculation. It is to be noted that because these operations generally take time, the results of calculations made in advance are subjected to Fourier transform, then stored in a storage device, and read out appropriately, thereby making it possible to increase the speeds and reduce the circuit sizes.

In addition, as can be seen from the formula (30), diffraction quantity depends on the wavelength. Therefore, when the image sensor 12 is a color sensor, processing may be separated for each of RGB to calculate diffraction patters for each wavelength for each color, thereby generating pattern data for development for each of RGB. Thus, developed images without any chromatic aberration can be obtained.

Furthermore, while Fresnel Zone Plate or Gabor Zone Plate has been described above as an example, the foregoing description can be also applied in the same way to random patterns and the like.

Eighth Embodiment

The influence of diffraction of light passing through the modulator is reduced by the pattern of the pattern data for development according to the seventh embodiment mentioned above. According to an eighth embodiment, the influence of light diffraction is reduced by the pattern formed at a modulator and the pattern of pattern data for development. An imaging device according to the eighth embodiment has the same configuration as the imaging device 10 shown in FIG. 2, but partially differs therefrom in the functions of the modulator 11 and image processing unit 13. The differences from the first embodiment will be described below.

In the case of the random patterns shown in FIGS. 35A to 35D, FIG. 35D is wider in pitch, and less likely to be influenced by diffraction than in FIG. 35A. However, as shown in FIG. 36, the correlation function for the pattern with the wider pitch is spread, thereby decreasing the resolution of a developed image. Therefore, a method of using a pattern with two-dimensional RLL (Run-Length Limited) modulation applied thereto for the pattern 11a of the modulator 11 and pattern data for development will be mentioned in order to achieve a balance between the pitch and the resolution.

The two-dimensional RLL modulation refers to a modulation method of limiting the minimum continuous number of transmitting/non-transmitting pixels with respect to one direction to K (K≥2, K: natural number) and limiting the minimum continuous number of transmitting/non-transmitting pixels with respect to a direction perpendicular to the foregoing direction to L (L≥2, L: natural number).

FIGS. 39A to 39D are diagrams illustrating parts of RLL patterns according to the eighth embodiment. FIGS. 39A, 39B, 39C, and 39D respectively show RLL patterns where the minimum continuous number of pixels is 1, 2, 4, and 8. The difference from the random patterns shown in FIGS. 35A to 35D is that, for example, the random pattern in FIG. 35B has only even numbers "2, 4, 6, 8, . . . " of patterns, whereas the RLL pattern in FIG. 39B can have "2, 3, 4, 5, 6, 7, 8, . . . " patterns except for 1 pattern. Accordingly, a difference is made in correlation function.

Figure 39A:
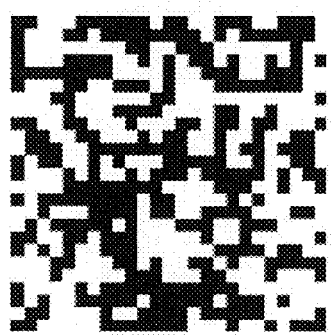
FIGS. 39A to 39D are diagrams illustrating parts of RLL patterns according to an eighth embodiment.
Figure 39B:
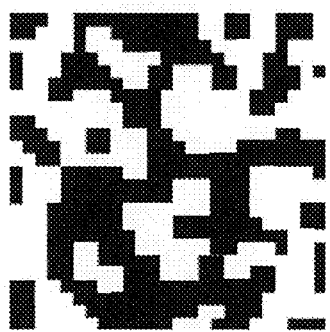
Figure 39C:
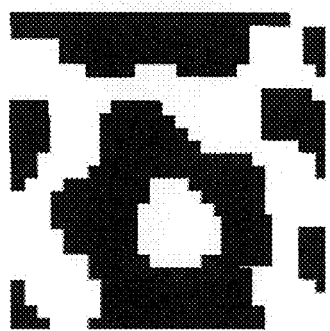
Figure 39D:
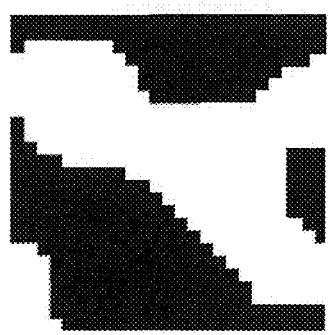
Figure 40:
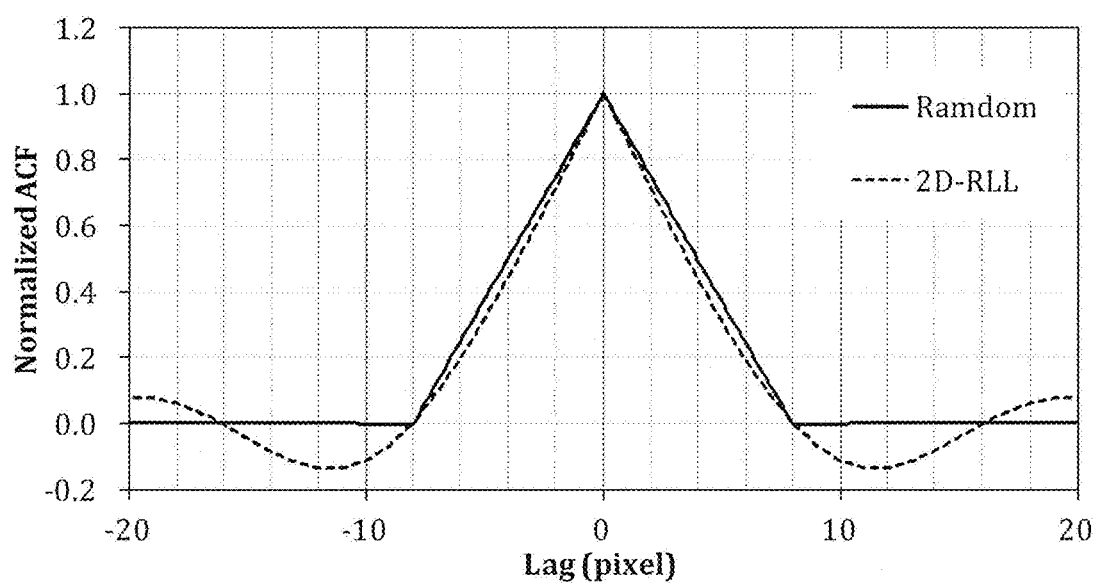
FIG. 40 is a diagram showing an autocorrelation function for the RLL pattern in FIG. 39D.

FIG. 40 is a diagram showing an autocorrelation function for the RLL pattern in FIG. 39D. The horizontal axis in FIG. 40 indicates Lag, whereas the vertical axis therein indicates ACF.

The graph shown by a solid line in FIG. 40 shows the AFC for the random pattern shown in FIG. 35D. The graph shown by a dotted line in FIG. 40 shows the AFC for the RLL pattern shown in FIG. 39D. As shown in FIG. 40, the ACF main lobe of the two-dimensional RLL pattern has a slightly reduced half width, and it can be confirmed that the influence of diffraction has been successfully reduced.

As described above, the two-dimensional RLL modulation is applied to the pattern 11a provided at the modulator 11 and the pattern data for development. Thus, the imaging device 10 can prevent image quality from being degraded by diffraction.

Ninth Embodiment

Imaging limited to one-dimensional directions, but not imaging in two-dimensional directions, will be described in a ninth embodiment.

Figure 41:
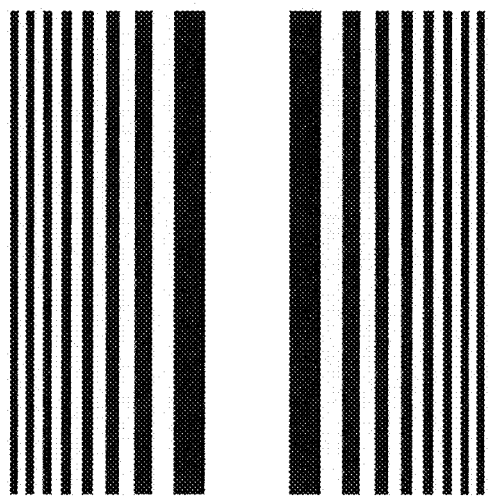
FIG. 41 is a diagram illustrating a pattern example according to a ninth embodiment.

FIG. 41 is a diagram illustrating a pattern example according to the ninth embodiment. The pattern formed at the modulator and the pattern of pattern data for development are supposed to have one-dimensional patterns as shown in FIG. 41. As just described, through the use of a pattern with identical patterns continuous in the vertical direction, an imaging device restores an image only in the horizontal direction.

Figure 42:
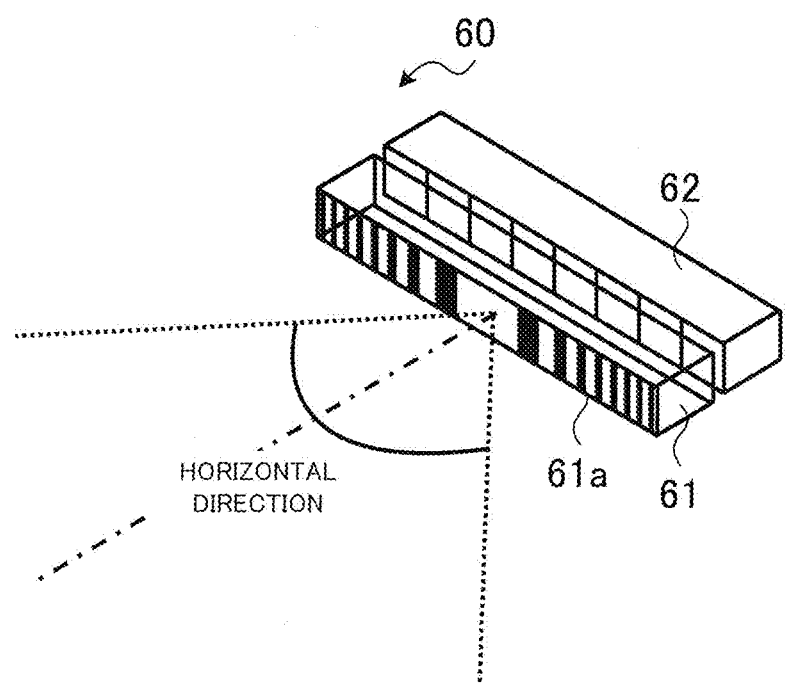
FIG. 42 is a diagram No. 1 illustrating an example of an imaging device using the pattern in FIG. 41.

FIG. 42 is a diagram No. 1 illustrating an example of an imaging device using the pattern in FIG. 41. As shown in FIG. 42, an imaging device 60 has a modulator 61 and a line sensor 62.

At the surface of the modulator 61, a one-dimensional pattern 61a is formed as explained with reference to FIG. 41. Light is modulated by the modulator 61.

The line sensor 62 outputs shot image data to an image processing unit (not shown). The image processing unit has, for example, the same function as that of the image processing unit 13 according to the first embodiment, but differs therefrom in terms of one-dimensional development.

The use of the one-dimensional line sensor 62 reduces the sensor cost, and furthermore, Fourier transform is carried out only one-dimensionally, thereby making it possible to increase the speed and reduce the circuit size.

Figure 43:
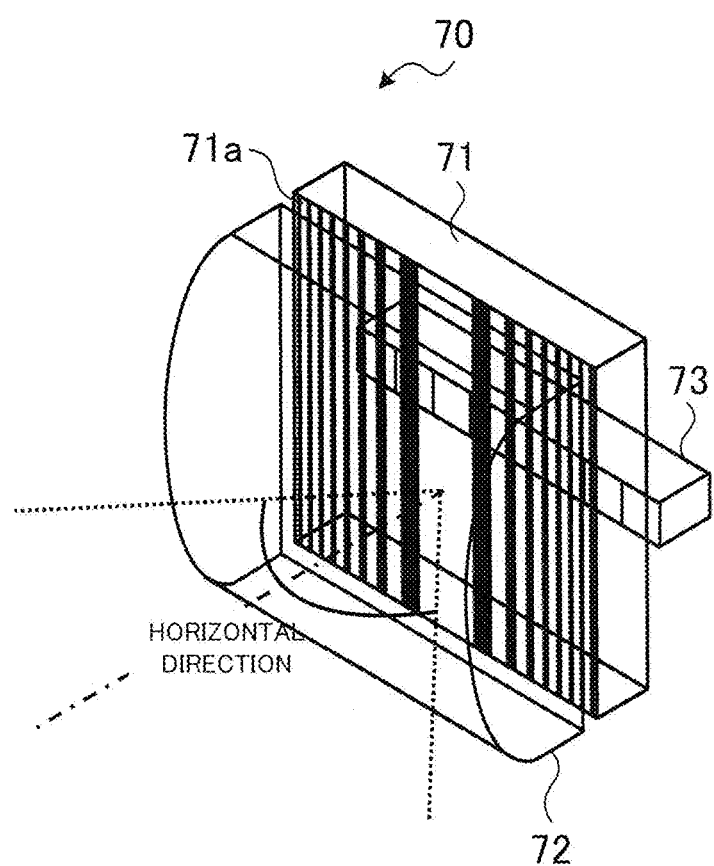
FIG. 43 is a diagram No. 2 illustrating an example of an imaging device using the pattern in FIG. 41.

FIG. 43 is a diagram No. 2 illustrating an example of an imaging device using the pattern in FIG. 41. As shown in FIG. 43, an imaging device 70 has a modulator 71, a cylindrical lens 72, and a line sensor 73.

At the surface of the modulator 71, a one-dimensional pattern 71a is formed as explained with reference to FIG. 41. Light is modulated by the modulator 71.

The cylindrical lens 72 is disposed such that the focal point is positioned on the line sensor 73.

The line sensor 73 is configured in the same fashion as the line sensor 62 in FIG. 42, and the description thereof will be omitted.

The configuration in FIG. 43 can detect more light than that in FIG. 42, and the SNR of a developed image can be thus improved.

Figure 44:
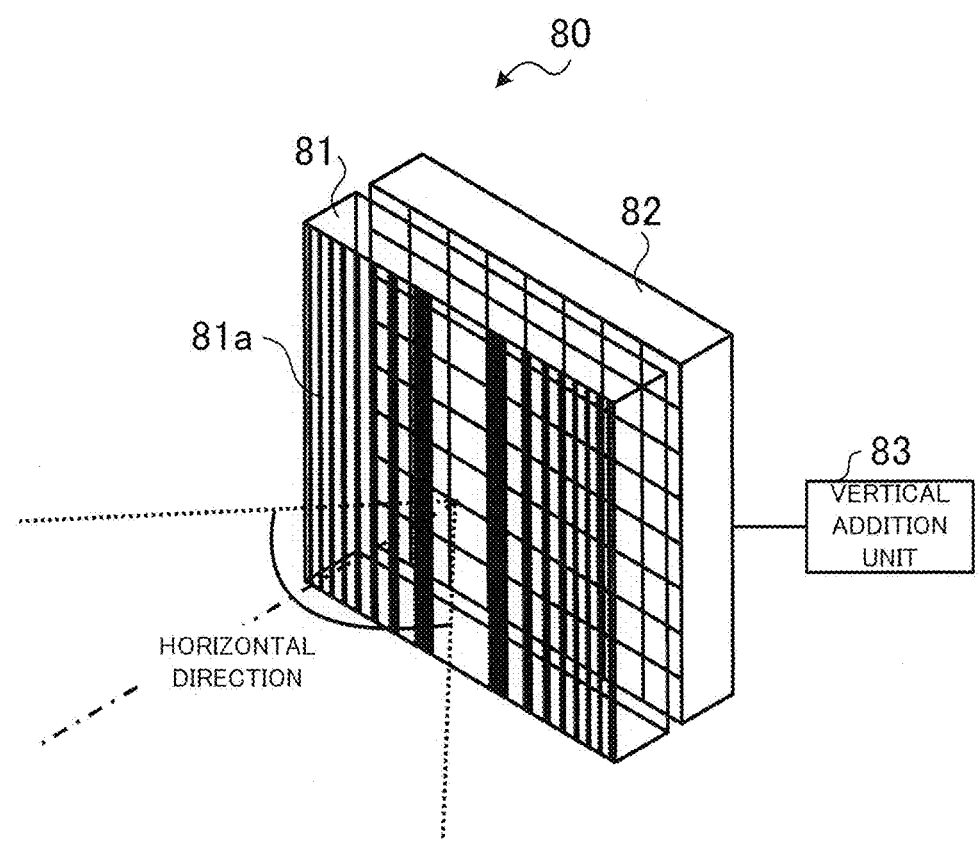
FIG. 44 is a diagram No. 3 illustrating an example of an imaging device using the pattern in FIG. 41.

FIG. 44 is a diagram No. 3 illustrating an example of an imaging device using the pattern in FIG. 41. As shown in FIG. 44, an imaging device 80 has a modulator 81, an image sensor 82, and a vertical addition unit 83.

At the surface of the modulator 81, a one-dimensional pattern 81a is formed as explained with reference to FIG. 41. Light is modulated by the modulator 81.

The vertical addition unit 83 adds the vertical luminance of image data output from the two-dimensional image sensor 82. The image data with the luminance added thereto is output to an image processing unit (not shown).

The configuration in FIG. 44 can detect a lot of light without using the cylindrical lens 72 as in FIG. 43, and the SNR of a developed image can be thus improved.

As described above, the pattern that is continuously identical in transmission in one direction may be applied to the pattern provided at the modulator and the pattern of the pattern data for development. Thus, the imaging device can achieve one-dimensional imaging.

In addition, the imaging device can cause an increase in processing speed and a reduction in circuit size, through the limitation to one-dimensional imaging.

It is to be noted that while the configuration specialized for the horizontal direction has been described above, the use of a grating pattern with identical patterns continuous in the horizontal direction can also allow detection only in the vertical direction, and detection in a direction at any angle.

In addition, it is also possible for the one-dimensional sensor to obtain two-dimensional images, by varying the angle of the pattern with time, such as rotating the configuration in FIG. 42, for example.

In addition, while an example of Fresnel Zone Plate is shown in FIG. 41, this embodiment can be also applied to patterns such as random patterns and RLL patterns.

The present invention described above is not to be considered limited to the embodiments mentioned above, but considered to encompass various modification examples. For example, the embodiment mentioned above have been described in detail for clearly explaining the present invention, but are not necessarily to be considered limited to the inclusion of all of the configurations described.

In addition, it is possible to replace a part of a configuration according to an embodiment with a configuration according to another embodiment. In addition, it is also possible to add a configuration according to an embodiment to a configuration according to another embodiment.

In addition, it is possible to add/remove/substitute another configuration to/from/for a part of the configuration according to each embodiment.

In addition, the respective configurations, functions, processing units, processing means, etc. mentioned above may be partially or entirely achieved with hardware, for example, by designing with integrated circuits. In addition, the respective configurations, functions, etc. mentioned above may be achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs.

In addition, the control lines and information lines are shown which are considered required for the sake of explanation, but all of the control lines and information lines required for a product are not always shown. In fact, it is conceivable that almost all of the configurations are interconnected.

What is claimed is:

1. An imaging device comprising:
    a modulator comprising a first pattern, the modulator configured to modulate light intensity;
    an image sensor configured to convert light passing through the modulator to image data, and output the image data; and
    an image processing unit configured to restore an image on a basis of cross-correlation operation with the image data and pattern data that represents a second pattern;
    wherein the modulator has multiple patterns that differ in initial phase, and the image processing unit has the pattern data with different initial phases corresponding to the multiple patterns.

2. The imaging device according to claim 1, wherein the second pattern has a pattern similar to the first pattern.

3. The imaging device according to claim 1, wherein the cross-correlation operation is based on convolution operation with the image data and the pattern data.

4. The imaging device according to claim 1, wherein the cross-correlation operation is based on multiplication operation with a Fourier transformed image data and a Fourier transformed pattern data.

5. The imaging device according to claim 1, further comprising a focusing unit configured to enlarge and reduce the pattern data.

6. The imaging device according to claim 1, further comprising a modulation control unit configured to switch the multiple patterns that differ in initial phase at the modulator in a time-division manner,
    wherein the image processing unit changes the initial phase of the pattern data in response to initial phase switching of the modulation control unit.

7. The imaging device according to claim 1, wherein the first pattern and the second pattern each comprise a random pattern.

8. The imaging device according to claim 1, wherein for the first pattern and the second pattern, autocorrelation functions each have a single peak.

9. The imaging device according to claim 1, wherein the first pattern and the second pattern each comprise a speckle-based pattern.

10. The imaging device according to claim 1, wherein the pattern data is created from an estimated diffraction image by estimating the diffraction image obtained when the pattern of the modulator is projected onto the image sensor, on the basis of any one or all of a thickness of the modulator, a refractive index of the modulator, and a wavelength intended for shooting.

11. An imaging device comprising:
    a modulator comprising a first pattern, the modulator configured to modulate light intensity;
    an image sensor configured to convert light passing through the modulator to image data, and output the image data; and
    an image processing unit configured to restore an image on a basis of cross-correlation operation with the image data and pattern data that represents a second pattern;

wherein the first pattern and the second pattern each comprise a pattern with two-dimensional RLL (Run-Length Limited) modulation applied thereto.

12. An imaging device comprising:
a modulator comprising a first pattern, the modulator configured to modulate light intensity;
an image sensor configured to convert light passing through the modulator to image data, and output the image data; and
an image processing unit configured to restore an image on a basis of cross-correlation operation with the image data and pattern data that represents a second pattern;
wherein the first pattern and the second pattern each comprise a pattern that is continuously identical in transmission in one direction.

13. An imaging device comprising:
a modulator comprising a first pattern, the modulator configured to modulate light intensity;
an image sensor configured to convert light passing through the modulator to image data, and output the image data; and
an image processing unit configured to restore an image on a basis of cross-correlation operation with the image data and pattern data that represents a second pattern;
wherein the first pattern and the second pattern each comprise a concentric pattern.

14. The imaging device according to claim 13, wherein the concentric pattern is narrowed with distance from the center.

15. An imaging method comprising the steps of:
converting, to image data, light passing through a modulator comprising a first pattern, the modulator configured to modulate light intensity, and outputting the image data; and
restoring an image on a basis of cross-correlation operation with the image data and pattern data that represents a second pattern;
wherein the modulator has multiple patterns that differ in initial phase, and the image processing unit has the pattern data with different initial phases corresponding to the multiple patterns.

* * * * *